United States Patent
Mo

(10) Patent No.: US 11,110,352 B2
(45) Date of Patent: Sep. 7, 2021

(54) OBJECT MOVING METHOD AND APPARATUS, STORAGE MEDIUM, AND ELECTRONIC APPARATUS

(71) Applicant: TENCENT TECHNOLOGY (SHENZHEN) COMPANY LIMITED, Guangdong (CN)

(72) Inventor: Xi Chang Mo, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 0 days.

(21) Appl. No.: 16/541,643

(22) Filed: Aug. 15, 2019

(65) Prior Publication Data

US 2019/0366215 A1 Dec. 5, 2019

Related U.S. Application Data

(63) Continuation of application No. PCT/CN2018/086006, filed on May 8, 2018.

(30) Foreign Application Priority Data

May 25, 2017 (CN) .......................... 201710383748.8

(51) Int. Cl.
*A63F 13/577* (2014.01)
*G06T 1/60* (2006.01)
(Continued)

(52) U.S. Cl.
CPC .............. *A63F 13/577* (2014.09); *G06T 1/60* (2013.01); *G06T 15/08* (2013.01); *G06T 17/20* (2013.01);
(Continued)

(58) Field of Classification Search
CPC ........ A63F 13/577; A63F 13/57; A63F 13/58; A63F 2300/64; G06T 19/20; G06T 1/60;
(Continued)

(56) References Cited

U.S. PATENT DOCUMENTS

| | | | | |
|---|---|---|---|---|
| 2009/0253502 A1* | 10/2009 | Kiyomoto | ............... | A63F 13/10 463/31 |
| 2009/0285407 A1* | 11/2009 | Cragun | ................... | G06T 19/00 381/61 |
| 2015/0091906 A1* | 4/2015 | Dishno | ................. | G06F 16/954 345/427 |

FOREIGN PATENT DOCUMENTS

| CN | 101241507 A | 8/2008 |
|---|---|---|
| CN | 103714234 A | 4/2014 |

(Continued)

OTHER PUBLICATIONS

Office Action of Chinese Application 201710383748.8 dated Mar. 28, 2018.
(Continued)

*Primary Examiner* — Xilin Guo
(74) *Attorney, Agent, or Firm* — Sughrue Mion, PLLC

(57) ABSTRACT

A method of moving an object in an application is provided. An operation instruction for moving a target object from a first grid to a second grid among a plurality of three-dimensional grids included in a three-dimensional map is obtained. Each of the plurality of three-dimensional grids is used to indicate a three-dimensional space. Target connectivity information between every two adjacent target grids in a target moving path from the first grid to the second grid, among the plurality of three-dimensional grids is obtained. Whether the first grid and the second grid are connected is determined based on the target connectivity information. The target object is moved from the first grid to the second grid in the three-dimensional map based on determining that the first grid and the second grid are connected.

14 Claims, 14 Drawing Sheets

(51) Int. Cl.
    *G06T 15/08* (2011.01)
    *G06T 17/20* (2006.01)
    *G06T 19/20* (2011.01)
(52) U.S. Cl.
    CPC .......... *G06T 19/20* (2013.01); *G06T 2210/21* (2013.01); *G06T 2210/61* (2013.01); *G06T 2219/2016* (2013.01)
(58) Field of Classification Search
    CPC ..... G06T 15/08; G06T 17/20; G06T 2210/21; G06T 2219/2016; G06T 2210/61; G06T 1/00; G06T 17/00; G06T 17/05; G06T 2200/04; G06F 9/451; G06F 30/00; H04N 21/25883; G08G 5/0026; G08G 5/045
    See application file for complete search history.

(56) References Cited

FOREIGN PATENT DOCUMENTS

| | | |
|---|---|---|
| CN | 107357563 A | 11/2017 |
| JP | 2017-086215 A | 5/2017 |
| KR | 10-2005-0060796 A | 6/2005 |

OTHER PUBLICATIONS

Office Action of Chinese Application 201710383748.8 dated May 16, 2018.
International Search Report for PCT/CN2018/086006 dated Jul. 27, 2018 [PCT/ISA210].
Lee et al., "Fast Grid-based Path Finding for Video Games", Canadian Conference on AI, 2013 (12 pages total).
Nash et al., "Any-Angle Path Planning", AI Magazine, Association for the Advancement of Artificial Intelligence, Winter 2013, pp. 85-107 (23 pages total).
Van Toll et al., "The Explicit Corridor Map: A Medial Axis-Based Navigation Mesh for Multi-Layered Environments", Jan. 19, 2017 (34 pages total).
Notification of Reason for Refusal dated Sep. 19, 2020 from the Korean Intellectual Property Office in Application No. 10-2019-7029556.
Notice of Reasons for Refusal dated Sep. 29, 2020 from the Japanese Patent Office in Application No. 2019-540537.
Written Opinion dated Jul. 27, 2018 issued by the International Searching Authority in International application No. PCT/CN2018/086006.

* cited by examiner

OBJECT MOVING METHOD AND APPARATUS, STORAGE MEDIUM, AND ELECTRONIC APPARATUS

CROSS-REFERENCE TO RELATED APPLICATION(S)

This application is a continuation application of International Application No. PCT/CN2018/086006, filed with the Chinese Patent Office on May 8, 2018, which claims priority to Chinese Patent Application No. 201710383748.8, entitled "OBJECT MOVING METHOD AND APPARATUS, STORAGE MEDIUM, AND ELECTRONIC APPARATUS" filed with the Chinese Patent Office on May 25, 2017, the disclosures of which are hereby incorporated herein by reference in their entireties.

BACKGROUND

1. Field

The disclosure relates to the field of computers, and particularly, to an object moving method and apparatus, a storage medium, and an electronic apparatus.

2. Description of the Related Art

Three-dimensional (3D) game engines are mainly developed for stand-alone games or client-game clients. Client-games generally include conventional online games that can be played on computers by downloading clients.

Since a first 3D game was launched in 1992, development has been made for many years, and a large quantity of commercial engines, such as BigWorld, Gamebryo, Unreal, and Cry Engine, have emerged.

In countries such as South Korea where broadband network services are advanced and related laws and regulations are favorable, a game developer can place all logic calculations in a client, and a server of an online game may exist merely as a data exchange node. However, in countries with slower development of the Internet and complex Internet environment, a relevant function placed in a client is extremely likely to be cracked and used for cheating, and existence of a plug-in cannot be prevented. Therefore, a game server is required to bear most kernel calculations and data maintenance functions. Consequently, there is a problem that a server is required to handle 3D scene management and collision.

In addition, with development of massively multi-player online role-playing games (MMORPGs), major manufacturers have introduced more increasingly complex gameplay into their games. For example, building and construction originally existing merely in a real-time strategy (RTS) games are also introduced into MMORPGs. Such a development trend imposes higher requirements on clients and servers of MMORPGs.

SUMMARY

One or more example embodiments provide an object moving method and apparatus, a storage medium, and an electronic apparatus, to solve at least a technical problem of low efficiency in moving an object from a location to another location in the related technology of three-dimensional applications. In particular, one or more example embodiments provide a method, an apparatus, a computer storage medium, and an electronic apparatus for moving a target object in a three-dimensional application, in which a speed and efficiency in moving the target object are improved.

According to an aspect of an example embodiment, a method of moving an object in an application is provided. An operation instruction for moving a target object from a first grid to a second grid among a plurality of three-dimensional grids included in a three-dimensional map is obtained. Each of the plurality of three-dimensional grids is used to indicate a three-dimensional space. Target connectivity information between every two adjacent target grids in a target moving path from the first grid to the second grid, among the plurality of three-dimensional grids is obtained. Whether the first grid and the second grid are connected is determined based on the target connectivity information. The target object is moved from the first grid to the second grid in the three-dimensional map based on determining that the first grid and the second grid are connected.

According to another aspect of an example embodiment, provided is an object moving apparatus, including: at least one memory operable to store program code; and at least one processor operable to read the program code and operate as instructed by the program code. The program code includes: first obtaining code configured to cause the at least one processor to obtain an operation instruction for moving a target object from a first grid to a second grid among a plurality of three-dimensional grids included in a three-dimensional map, each of the plurality of three-dimensional grids being used to indicate a three-dimensional space; second obtaining code configured to cause the at least one processor to obtain target connectivity information between every two adjacent target grids in a target moving path from the first grid to the second grid, among the plurality of three-dimensional grids; determining code configured to cause the at least one processor to determine whether the first grid and the second grid are connected based on the target connectivity information; and moving code configured to cause the at least one processor to move the target object from the first grid to the second grid in the three-dimensional map based on determining that the first grid and the second grid are connected.

According to still another aspect of an example embodiment, provided is a non-transitory storage medium, the storage medium storing a computer program executed by at least one processor to perform: obtaining an operation instruction for moving a target object from a first grid to a second grid among a plurality of three-dimensional grids included in a three-dimensional map, each of the plurality of three-dimensional grids being used to indicate a three-dimensional space; obtaining target connectivity information between every two adjacent target grids in a target moving path from the first grid to the second grid, among the plurality of three-dimensional grids; determining whether the first grid and the second grid are connected based on the target connectivity information; and moving the target object from the first grid to the second grid in the three-dimensional map based on determining that the first grid and the second grid are connected.

According to still another aspect of an example embodiment, provided is an electronic apparatus, including at least one memory operable to store program code; and the at least one processor operable to read the program code and operate as instructed by the program code to perform the method described above.

BRIEF DESCRIPTION OF THE DRAWINGS

The above and/or other aspects of the disclosure will become apparent and more readily appreciated from the following description of the embodiments, taken in conjunction with the accompanying drawing. Accompanying drawings described herein are used to provide further understanding about the disclosure, and constitute one portion of the disclosure. Exemplary embodiments and the corresponding descriptions are used to explain the disclosure, and do not constitute limitation on the disclosure.

DETAILED DESCRIPTION

Figure 1:
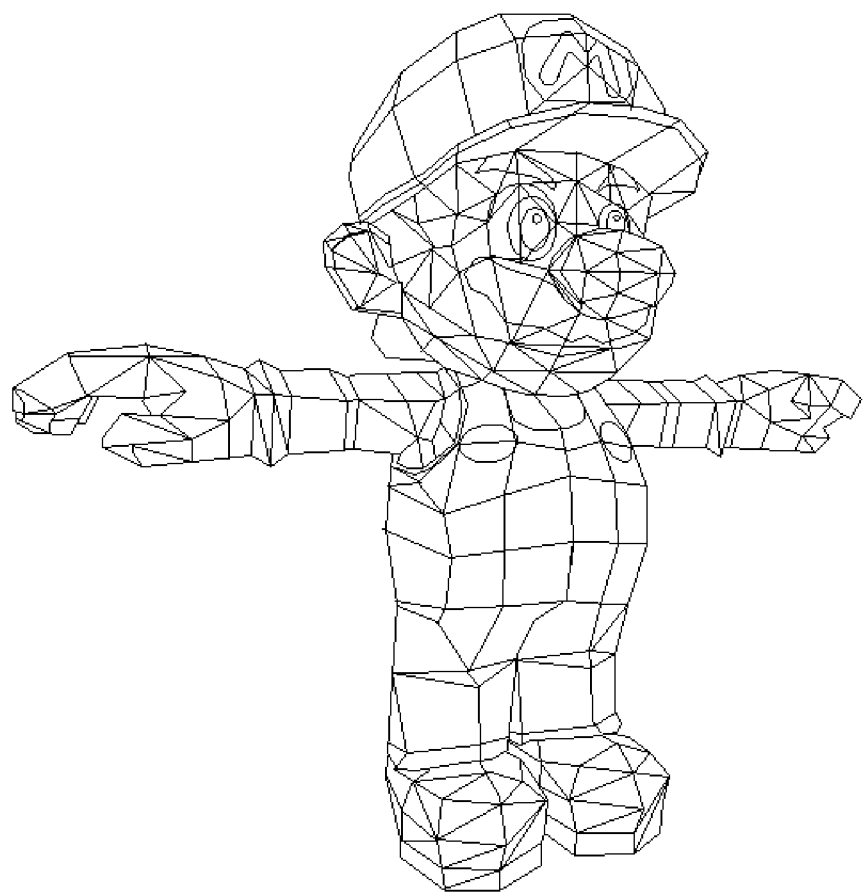
FIG. 1 is a schematic diagram of a description technology of a 3D scene using a polygon mesh according to the related technology.

To make a person skilled in the art understand the technical solutions in the disclosure better, the following clearly and completely describes the technical solutions in the embodiments with reference to the accompanying drawings in the embodiments. Apparently, the described embodiments are merely a part rather than all of the embodiments. All other embodiments obtained by a person of ordinary skill in the art based on the embodiments without creative efforts shall fall within the protection scope.

It should be noted that the terms "first", "second", and the like in the specification, the claims, and the foregoing accompanying drawings of the disclosure are merely used for distinguishing similar objects, and do not need to be used for describing a special sequence or order. It should be understood that data used in this way can be interchanged in an appropriate case, so that the embodiments of the disclosure that are described herein can be implemented in a sequence other than those sequences illustrated or described herein. Moreover, the terms "include", "contain" and any other variants mean to cover the non-exclusive inclusion, for example, a process, method, system, product, or device that includes a list of operations or units is not necessarily limited to those units, but may include other units not expressly listed or inherent to such a process, method, system, product, or device.

The term "a module" and/or "a unit" used in the disclosure is for referring to elements performing at least one function or operation, and these elements may be implemented as hardware or software, or as a combination of hardware and software. Further, a plurality of "modules" or "units" may be integrated into at least one module and implemented as at least one processor, except "modules" or "unit" that need to be implemented as specific hardware.

First, some nouns and terminals appearing in a process of describing the embodiments are applicable to the following explanations.

An online game, also referred to as an online game, is usually a video game in which a plurality of players enjoys interactive entertainment through a computer network.

An action game is a type of video game and emphasizes reactivity and hand-eye cooperation of a player. There are usually multiple skills that are continuously released in cooperation, to form gameplay in a combo form.

A real-time strategy (RTS) game is a type of strategy game and is played in real time, rather than being turn-based that is more common in strategy games.

A role-playing game (RPG) is a game type. In the game, a player plays the game in a specific scene by playing one or several characters in a virtual world. Usually, in such a game, a player roams in a game world by playing an adventurer, and various encounters (such as fighting, talking, and meeting important people) along the way are keys to character growth and game playing of the player.

A massive (or massively) multi-player online role-playing game (MMORPG) is a type of online game.

An online game client is a program that corresponds to an online game server and that provides a local service for a customer. The online game client is usually mounted on a user machine, and needs to run in cooperation with a server end.

An online game server is a software program corresponding to an online game client, installed in an IDC, and providing data forwarding and logical processing services for the online game client. Since a client installed on a machine of a player may be easily cracked and used for cheating, in an online game, complex and critical logic needs to be calculated on the online game server.

A voxel is a pixel of a volume as the name suggests, is a unit for representing a display basic point in a three-dimensional space, and is similar to a pixel in a two-dimensional (2D) plane.

FIG. 1 is a schematic diagram of a description technology of a three-dimensional (3D) scene using a polygon mesh according to the related technology. As shown in FIG. 1, a model object is decomposed into numerous small polygons for describing the object by modeling. An advantage of the polygon mesh is that decomposition of the polygons may be highly flexible, and description of model details may be highly precise, and the polygon mesh is a unanimous choice of conventional client 3D engines.

Because the polygon mesh requires a large quantity of floating point number operations, a performance loss is excessively large to a server. For example, after some common physics engines are transplanted into a server, a single process can only bear 100 to 200 user players. This is obviously unacceptable to an MMORPG that needs to support massive user gameplay.

In related art 3D game applications, a character object usually needs to be moved from a location to another location, and whether a character object can be moved from one location to another location depends on whether the two locations are connected. However, in the related technology, whether two locations are connected is usually determined by performing calculations in real time by using a dynamic connectivity algorithm. Each time a character object is moved by one movement unit, connectivity between the unit and a plurality of adjacent units needs to be calculated until the character object is moved from a starting point to an end point. In such a calculation manner, a calculation amount is large, and there are a large quantity of repeated calculations. Consequently, efficiency in determining whether two locations are connected is reduced, further leading to relatively low efficiency in moving a character object from a location to another location and a severe impact on game experience of a player.

As described above, in the related technology in 3D game applications, there are problems in that efficiency and speed in moving an object from a location to another location is low.

According to the embodiments, a method embodiment of an object moving method is provided.

Figure 2:
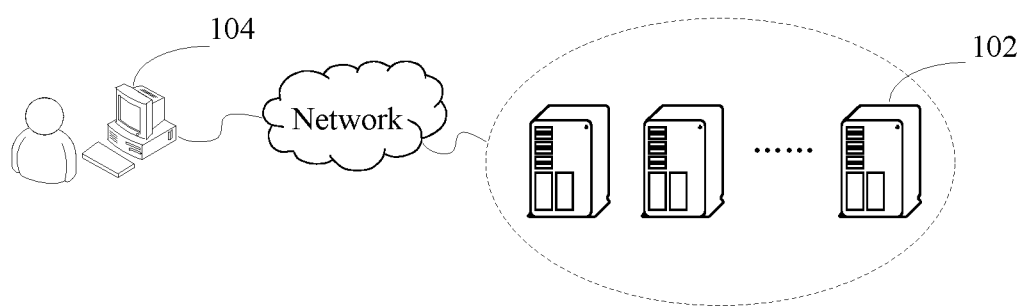
FIG. 2 is a schematic diagram of a hardware environment of an object moving method according to an embodiment.

Optionally, in this embodiment, the foregoing object moving method may be applied to a hardware environment formed by a server 102 and a terminal 104 shown in FIG. 2. As shown in FIG. 2, a server 102 is connected to a terminal 104 through a network. The foregoing network includes, for example but is not limited to, a wide area network, a metropolitan area network, or a local area network. The terminal 104 includes, for example but is not limited to, a PC, a mobile phone, a tablet computer, or the like. The object moving method in the embodiments can be performed by the server 102, or be performed by the terminal 104, or be performed by the server 102 and the terminal 104 together. The terminal 104 may perform the object moving method in the embodiments by using a client installed on the terminal 104.

The example embodiments are described by using an object moving method executed by a client as an example.

Figure 3:
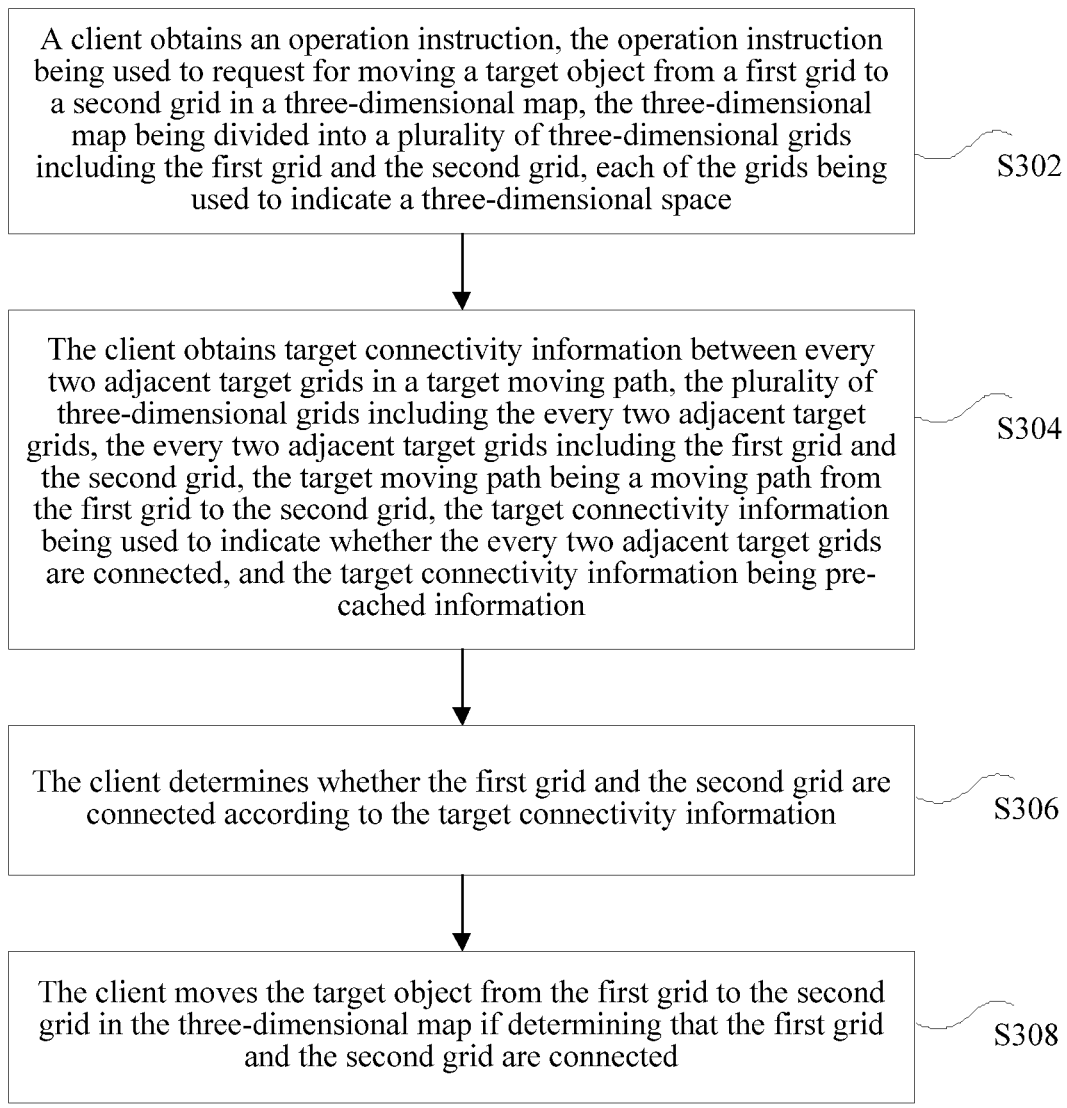
FIG. 3 is a flowchart of an optional object moving method according to an embodiment.

FIG. 3 is a flowchart of an optional object moving method according to an embodiment. As shown in FIG. 3, the method may include the following operations:

Operation S302: A client obtains an operation instruction, the operation instruction being used to request for moving a target object from a first grid to a second grid in a three-dimensional map, the three-dimensional map being divided into a plurality of three-dimensional grids including the first grid and the second grid, each of the grids being used to indicate a three-dimensional space.

Operation S304: The client obtains target connectivity information between every two adjacent target grids in a target moving path in which the target object is to be moved, the plurality of three-dimensional grids including the every two adjacent target grids, the every two adjacent target grids including the first grid and the second grid, the target moving path being a moving path from the first grid to the second grid, the target connectivity information being used to indicate whether the every two adjacent target grids are connected, and the target connectivity information being pre-cached information.

Operation S306: The client determines whether the first grid and the second grid are connected according to the target connectivity information.

Operation S308: The client moves the target object from the first grid to the second grid in the three-dimensional map based on determining that the first grid and the second grid are connected.

In the foregoing operations S302 to S308, a three-dimensional map is divided into a plurality of three-dimensional grids, and each grid indicates a three-dimensional space. After an operation instruction used to request for moving a target object from a first grid to a second grid is obtained, whether the first grid and the second grid are connected is determined by obtaining pre-cached target connectivity information between every two adjacent target grids in a target moving path from the first grid to the second grid, thereby improving efficiency of determining location connectivity. Further, if it is determined that the first grid and the second grid are connected, the target object is moved from the first grid to the second grid, so that the target object can be quickly moved from the first grid to the second grid. Accordingly, the example embodiments solve the technical problem of relatively low efficiency in moving an object from a location to another location in the related technology and achieves technical effects of shortening a time consumed for object moving and improving object moving efficiency.

In the technical solution provided in operation S302, the target object is an object that can be moved within a predetermined scene, and has attributes such as a length, a width, and a height. Optionally, the predetermined scene in which the target object is moved may be a map, and the map may be a three-dimensional map.

In an optional example, if the map is a three-dimensional map, the map may include a mountain, a building, and the like in addition to a horizontal ground, and the mountain or building may be higher than the horizontal ground and has a specific height. Moreover, the target object may further be moved between the horizontal ground and the building (or mountain). To accurately determine movement information of the target object in the map, the horizontal ground, the mountain, and the building in the map may be divided into a plurality of three-dimensional grids, where each grid may be used to indicate a three-dimensional space.

Optionally, in the three-dimensional map, the target object may be moved on grids of the same height or may be moved on grids of different heights.

In an optional example, the target object may be moved on a horizontal ground; the target object may be moved on buildings or mountains of the same height; the target object may be moved from a horizontal ground to a building or mountain higher than the horizontal ground; the target object can be moved from a building or mountain higher a horizontal ground to the horizontal ground; or the target object may be moved on a horizontal ground, a building, and a mountain that have different eights.

Optionally, if the three-dimensional map is divided into a plurality of three-dimensional grids, a starting point of moving the target object on the three-dimensional map is determined as a first grid, and an end point of moving the target object on the three-dimensional map is determined as a second grid.

Optionally, the operation instruction in this embodiment may be used to request for moving the target object from the first grid to the second grid. It should be noted that the first grid and the second grid may be any grids in the three-dimensional map. A triggering condition of the operation instruction is not specifically limited in this embodiment. For example, in a game application, when a game player clicks a mouse, drags a character object to move, or performs a similar operation in a game, generation of an operation instruction may triggered. It should be noted that in this embodiment, generation of the operation instruction may be triggered by another operation. Examples are not provided herein again one by one.

In the technical solution provided in operation S304, after obtaining an operation instruction, the client may respond to the operation instruction, and a response process may include: first determining a moving path from the first grid to the second grid, and determining the moving path as a target moving path; and then, determining a target grid on the target moving path, and subsequently, determining connectivity information between every two adjacent target grids in the target moving path, where, the connectivity information between the every two adjacent target cells in the moving path may be referred to as target connectivity information, the target connectivity information may be used to indicate whether the every two adjacent target cells are connected, and the target connectivity information is pre-cached information.

First, it should be noted that this embodiment, there may be one or more target moving paths from the first grid to the second grid. In this embodiment, a method for determining the target moving path from the first grid to the second grid is not specifically determined. After the target moving path from the first grid to the second grid is determined, the every two adjacent grids in the target moving path include the first grid and the second grid, and there may be one or more target grids between the first grid and the second grid in the target moving path. The moving path of moving from the first grid and the second grid may be formed through the target grids.

It should be further noted that whether every two adjacent target grids in the target moving path is connected may be indicated by pre-cached connectivity information between the every two adjacent target grids.

In an optional example, the target grid between the first grid and the second grid in the target moving path may include a grid 1, a grid 2, and a grid 3, where the grid 2 is adjacent to the grid 1 and the grid 3 separately. The grid 1 serves the first grid, and the grid 3 serves as the second grid. Whether the grid 1 and the grid 2 are connected can be determined through pre-cached connectivity information between the grid 1 and the grid 2. If it is determined that the grid 1 and the grid 2 are connected, the target object may be moved from the grid 1 to the grid 2. Further, if it can be determined that the grid 2 and the grid 3 are connected through pre-cached connectivity information between the grid 2 and the grid 3, the target object can be moved from the grid 2 to the grid 3. The above indicates connectivity from the grid 1 to the grid 3, and the target object may move from the grid 1 to the grid 3.

Optionally, connectivity information between any two adjacent grids in the three-dimensional map may be pre-stored in a preset database, and if connectivity information between every two adjacent target grids in the target moving path needs to be obtained, it can be directly obtained from the preset database. In this way, an amount of calculation for calculating connectivity between grids in real time can be greatly reduced, thereby improving efficiency of determining whether two locations are connected.

In an optional embodiment, the client may cache connectivity information of the plurality of three-dimensional grids in the three-dimensional grids before obtaining the operation instruction, where the connectivity information includes: connectivity information between any two adjacent grids of the plurality of three-dimensional grids.

It should be first noted herein that the any two adjacent target grids of the plurality of three-dimensional grids in the three-dimensional map may be two adjacent grids on a same layer, two adjacent grids located on adjacent layers, or two adjacent grids located on different layers. It should be noted that the two adjacent grids located on adjacent layers are respectively located on two adjacent layers in the three-dimensional map, and a grid to which one target grid of the two target grids is mapped on a layer on which the other target grid of the two target grids is located is the same as or adjacent to the other target grid; and the two adjacent grids located on different layers are respectively located on different layers in the three-dimensional map, the different layers are spaced by at least one layer, and a grid to which one target grid of the two target grids is mapped on a layer on which the other target grid of the two target grids is located is the same as or adjacent to the other target grid.

Optionally, a specific process of caching connectivity information of the plurality of three-dimensional grids in the three-dimensional map may be described as: the client performs the following operation on each of the plurality of three-dimensional grids, where each grid is recorded as a current grid in the following operation: obtaining connectivity information between the current grid and a grid adjacent to the current grid on a current layer and connectivity information between the current grid and a grid adjacent to the current grid on an adjacent layer, where the current layer is a layer on which the current grid is located in the three-dimensional map, and the adjacent layer is a layer adjacent to the current layer in the three-dimensional map.

In an optional example, the target grid in the target moving path may include a grid 1, a grid 2, and a grid 3, where the grid 2 is adjacent to the grid 1 and the grid 3 separately. The grid 1 serves the first grid, and the grid 3 serves as the second grid. The preset database may pre-store connectivity information A between the grid 1 and the grid 2 and connectivity information B between the grid 2 and the grid 3. In a case where it needs to be determined whether the first grid and the second grid are connected, the connectivity information A between the grid 1 and the grid 2, and the connectivity information B between the grid 2 and the grid 3 can be directly obtained from the preset database.

It should be noted that connectivity information between any current grid and a grid adjacent thereto in the three-dimensional map may include connectivity information between the current grid and a grid adjacent to the current grid on a current layer and connectivity information between the current grid and a grid adjacent to the current grid on an adjacent layer.

In an optional example, the current grid and the grid adjacent to the current grid on the current layer may indicate a grid adjacent to the current grid in directions, such as the front, the back, the left, and the right, on a layer on which the current grid is located, and the connectivity information between the current grid and the grid adjacent to the current grid on the current layer is connectivity information between the current grid and the grid adjacent to the current grid in directions, such as the front, the back, the left, and the right, on the layer on which the current grid is located. For example, a grid adjacent to the grid A includes four grids, and the four grids are respectively a grid 1 horizontally in front of the grid A, a grid 2 horizontally behind the grid A, a grid 3 horizontally to the left of the grid A, and a grid 4 horizontally to the right of the grid A. The connectivity information includes connectivity information between the grid A and the grid 1, connectivity information between the grid A and the grid 2, connectivity information between the grid A and the grid 3, and connectivity information between the grid A and the grid 4.

In an optional example, the current grid and the grid adjacent to the current grid on the adjacent layer may indicate that a grid adjacent to the current grid in directions, such as the front, the back, the left, and the right, on an adjacent layer, and the connectivity information between the current grid and the grid adjacent to the current grid on the adjacent layer is connectivity information between the current grid and the grid adjacent to the current grid in directions, such as the front, the back, the left, and the right, on the adjacent layer, where the adjacent layer may be a layer adjacent to a layer on which the current grid is located. For example, a first layer is a horizontal layer on which the current grid is located, and a second layer is a plane adjacent to the first layer and located above the first layer. The grid adjacent to the current grid may include a plurality of three-dimensional grids on two layers, which are respectively a grid 1 horizontally in front of a current grid A on the first layer, a grid 2 horizontally behind the current grid A on the first layer, a grid 3 horizontally to the left of the current grid A on the first layer, and a grid 4 horizontally to the right of the current grid A on the first layer; and a grid 5 in front of the current grid A on the second layer, a grid 6 behind the current grid A on the second layer, a grid 7 to the left of the current grid A on the second layer, a grid 8 to the right of the current grid A on the second layer, and a grid 9 right above the current grid A on the second layer. Connectivity information between the current grid A and a grid adjacent to the current grid on an adjacent layer may connectivity information respectively between the current grid A and the grid 1 to the grid 9.

In an optional embodiment, the client may set connectivity information between any two adjacent grids in the three-dimensional map by performing the following operations, and cache the specified connectivity information between the any two adjacent grids, so as to quickly obtain target connectivity information between every two adjacent target grids in the target moving path, thereby improving efficiency of determining whether the first grid and the second grid are connected. When the following operations are performed, any two adjacent grids in the three-dimensional map are referred to as a third grid and a fourth grid.

The connectivity information from the third grid to the fourth grid is set to indicate connectivity in a case where a layer on which the third grid is located in the three-dimensional map is higher than a layer on which the fourth grid is located in the three-dimensional map, a height of the fourth grid is greater than or equal to a height of the target object, and a width of the fourth grid is greater than or equal to width of the target object.

The connectivity information from the fourth grid to the third grid is set to indicate connectivity in a case where a layer on which the third grid is located in the three-dimensional map is lower than a layer on which the fourth grid is located in the three-dimensional map, a height of the third grid is greater than or equal to a height of the target object, and a width of the third grid is greater than or equal to width of the target object.

The connectivity information from the third grid to the fourth grid is set to indicate connectivity in a case where a layer on which the third grid is located in the three-dimensional map is lower than a layer on which the fourth grid is located in the three-dimensional map by a first height difference, the first height difference is less than or equal to a first threshold, a height of the fourth grid is greater than or equal to a height of the target object, and a width of the fourth grid is greater than or equal to a width of the target object.

The connectivity information from the fourth grid to the third grid is set to indicate connectivity in a case where a layer on which the third grid is located in the three-dimensional map is higher than a layer on which the fourth grid is located in the three-dimensional map by a second height difference, the second height difference is less than or equal to a second threshold, a height of the third grid is greater than or equal to a height of the target object, and a width of the third grid is greater than or equal to a width of the target object.

For the foregoing four cases, it should be noted that an operation of determining whether the height and the width of the grid are greater than or equal to the height and the width of the target object is used to enable a target grid to accommodate the target object in moving the target object, and an operation of determining a height of a layer between two adjacent grids and a height difference between layers is to ensure that the target object can always be successfully moved downward, but when being moved upward, the target object can be successfully moved only when a height difference between layers is lower than a predetermined threshold, where the predetermined threshold (that is, the first threshold and the second threshold) may be set or adjusted according to an actual requirement.

In this manner according to an example embodiment, connectivity information between any two adjacent grids in the three-dimensional map may be preset and then cached, to allow direct and quick obtaining of target connectivity information between every two adjacent target grids in the target moving path from the pre-cached connectivity information. Therefore, according to an example embodiment, efficiency in determining whether the first grid and the second grid are connected according to the target connectivity information is greatly improved, and a speed and efficiency in moving the target object from the first grid to the second grid are improved.

In an optional embodiment, the obtaining, by the client, target connectivity information between every two adjacent target grids in a target moving path may include one of the following: (i) obtaining, by the client, first target connectivity information, where the first target connectivity information indicates that the two target grids are not connected; (ii) obtaining, by the client, second target connectivity information, where the second target connectivity information indicates that the two target grids are connected, and the two target grids are located on a same layer in the three-dimensional map; (iii) obtaining, by the client, third target connectivity information, where the third target connectivity information indicates that the two target grids are connected, the two target grids are respectively located on two adjacent layers in the three-dimensional map, and a grid to which one target grid of the two target grids is mapped on a layer on which the other target grid of the two target grids is located is the same as or adjacent to the other target grid; and (iv) obtaining, by the client, fourth target connectivity information, where the fourth target connectivity information indicates that the two target grids are connected, and the two target grids are respectively located on different layers in the three-dimensional map, the different layers are spaced by at least one layer, and a grid to which one target grid of the two target grids is mapped on a layer on which the other target grid of the two target grids is located is the same as or adjacent to the other target grid.

According to an example embodiment, the target connectivity information between every two adjacent target grids in the target moving path obtained from the pre-cached connectivity information between any two adjacent grids in the three-dimensional map may be any type of the first target connectivity information, the second target connectivity information, the third target connectivity information, and the fourth target connectivity information. When the first target connectivity information is obtained, it can be determined that the two target grids are not connected; when the second target connectivity information is obtained, it can be determined that the two target grids are connected, and the two target grids are located on a same layer in the three-dimensional map; when the third target connectivity information is obtained, it can be determined that the two target grids are connected, and the two target grids are located on two adjacent layers in the three-dimensional map; and when the fourth target connectivity information is obtained, it can be determined that the two target grids are connected, and the two target grids are located on different layers in the three-dimensional map, where the different layers are spaced by at least one layer. In this embodiment, by obtaining different types of target connectivity information, connectivity between every two adjacent target grids in the target moving path may be determined, to assist further determining determine connectivity between the first grid and the second grid.

In an optional example, the target grid A is adjacent to the grid 1 on a same layer in a target direction, for example, horizontally in front of the grid 1, the grid 5 is adjacent to the target grid A in a target direction on an upper adjacent layer, the grid 6 is adjacent to the target grid A in a target direction on an $N^{th}$ layer, where the $N^{th}$ layer is a layer other than a layer where the target grid is located and the upper adjacent layer thereof. If the target grid A is connected to none of the grid 1, the grid 5, and the grid 6, the first target connectivity information may be used to represent that the target grid A is connected to none of the target grids adjacent thereto in the target direction; if the target grid A is connected to the grid 1, the second target connectivity information may be used to represent that the target grid A is connected to the target grid adjacent thereto in the target direction on the same layer; if the target grid A is connected to the grid 5, the third target connectivity information may be used to represent that the target grid A is connected to the target grid adjacent thereto in the target direction on the upper adjacent layer; and if the target grid A is connected to the grid 6, the fourth target connectivity information may be used to represent that the target grid A is connected to the target grid adjacent thereto in the target direction on an further upper layer.

It should be noted that if the target connectivity information is the fourth target connectivity information, to ensure accuracy of connectivity between two adjacent target grids, in this embodiment, whether two adjacent target grids are connected may be determined in real time by using a connectivity determining method with reference to the four cases in the foregoing embodiment, for example. When two adjacent target grids satisfy any one of the foregoing cases, it can be determined that the two adjacent target grids are connected; otherwise, it is determined that the two adjacent target grids are not connected.

In an optional embodiment, target grids in the target moving path may be traversed starting from the first grid, to sequentially obtain target connectivity information between every two adjacent target grids. Specifically, if a plurality of target grids is included between the first grid and the second grid, starting from the first grid, the first grid is used as a current grid, and connectivity information between the current grid and a next grid adjacent thereto is objected, then, the next grid is used as a current grid, connectivity information between the current grid and a next grid adjacent thereto is repeatedly sequentially obtained, and traversing is not stopped until a next grid is the second grid, thereby obtaining target connectivity information between every adjacent two target grids in the target moving path.

In an optional example, the first grid is a grid 1, the second grid is a grid 2, and a grid 3 and a grid 4 are included between the grid 1 and the grid 2. The grid 1 is adjacent to the grid 3, the grid 3 is adjacent to the grid 1 and the grid 4 separately, and the grid 4 is adjacent to the grid 3 and the grid 2 separately. The grid 1, the grid 3, the grid 4, and the grid 2 are traversed sequentially. First, the grid 1 is used as a current grid, the grid 3 is used as a next grid, and connectivity information between the grid 1 and the grid 3 is obtained; further, the grid 3 is used as a current grid, the grid 4 is used as a next grid, and connectivity information between the grid 3 and the grid 4 is obtained; then, the grid 4 is used as a current grid, the grid 2 is used as a next grid, connectivity information between the grid 4 and the grid 2 is obtained, and the traversing is stopped after the connectivity information between the grid 4 and the grid 2 is obtained.

In the technical solution provided by operation S306, after obtaining the target connectivity information between every adjacent two target grids in the target moving path, the client may determine whether the first grid and the second grid are connected according to the obtained target connectivity information.

In an optional embodiment, the determining, by the client, whether the first grid and the second grid are connected according to the target connectivity information may include: determining, by the client, that the first grid and the second grid are not connected if the target connectivity information indicates that there are two adjacent target grids that are not connected in the target moving path; and determining, by the client, that the first grid and the second grid are connected if the target connectivity information indicates that every two adjacent target grids are connected in the target moving path.

It should be noted that when it is determined whether the first grid and the second grid are connected according to the obtained target connectivity information, if the target connectivity information indicates that there are two adjacent target grids that are not connected, regardless of how many pairs of two adjacent target grids are not connected, it can be determined that the first grid and the second grid are not connected. It can be determined that the first grid and the second grid are connected only when every two adjacent target grids in the target moving path is connected.

In an actual application scenario, if it is obtained that there are two adjacent target grids are not connected in the target moving path, it can be directly determined that the first grid and the second grid are not connected without continuously obtaining target connectivity information between other two adjacent target grids in the target moving path, so that a time of determining whether the first grid and the second grid are connected is saved, hereby improving efficiency in determining connectivity.

In an optional example, the grid 2 and the grid 3 that are sequentially adjacent to the first grid 1 and the second grid 4 are included between the first grid 1 and the second grid 4. If the grid 1 is connected to the grid 2 adjacent thereto, the grid 2 is connected to the grid 3 adjacent thereto, and the grid 3 is connected to the grid 4 adjacent thereto, it can be determined that the grid 1 and the grid 4 are connected. If any group of the grid 1 and the grid 2, the grid 2 and the grid 3, and the grid 3 and the grid 4 are not connected, it can be determined that the grid 1 and the grid 4 are not connected.

In the technical solution provided by operation S308, if it is determined that the first grid and the second grid are connected according to the obtained target connectivity information, the client may move the target object from the first grid to the second grid in the three-dimensional map, to respond to the obtained operation instruction. It should be noted that in this embodiment, a moving manner of moving the target object from the first grid to the second grid is not specifically defined. For example, in an actual application scenario, in this embodiment, the target object may be moved from the first grid to the second grid by directly moving the target object from the first grid to the second grid, that is, making the target object directly jump from the first grid to the second grid, or moving the target object along the target moving path from the first grid to the second grid.

The disclosure further provides an example embodiment relating to a collision detection performance optimization method of a voxel-based 3D scene description system.

Figure 4:
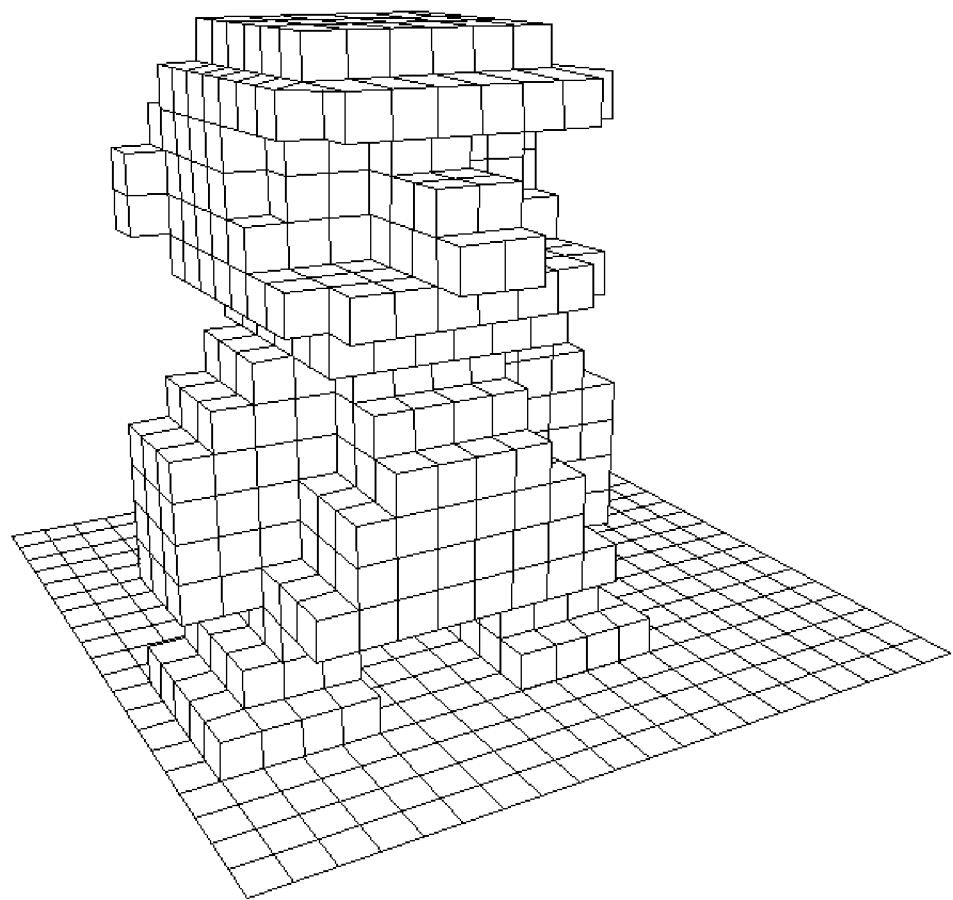
FIG. 4 is a schematic diagram of a 3D scene based on a voxel solution according to an embodiment.

FIG. 4 is a schematic diagram of a 3D scene based on a voxel solution according to an embodiment. As shown in FIG. 4, the model shown FIG. 1 is decomposed into numerous small blocks (voxels).

Rules for modeling a voxel-based 3D scene are described as follows:

A 3D scene is discretized in voxel.

A location of a voxel is positioned with a triple (x, y, layer).

A location of a moved object in space is described with a quadruple (x, y, z, layer).

A voxel where layer=0 is a ground layer, and an upper edge height of the voxel is recorded A voxel where layer>0 is a building layer, and upper and edge heights of the voxel are recorded.

Based on the foregoing rules, not only a scene can be completely described, but also a coordinate location of any element in the scene can be positioned.

Figure 5:
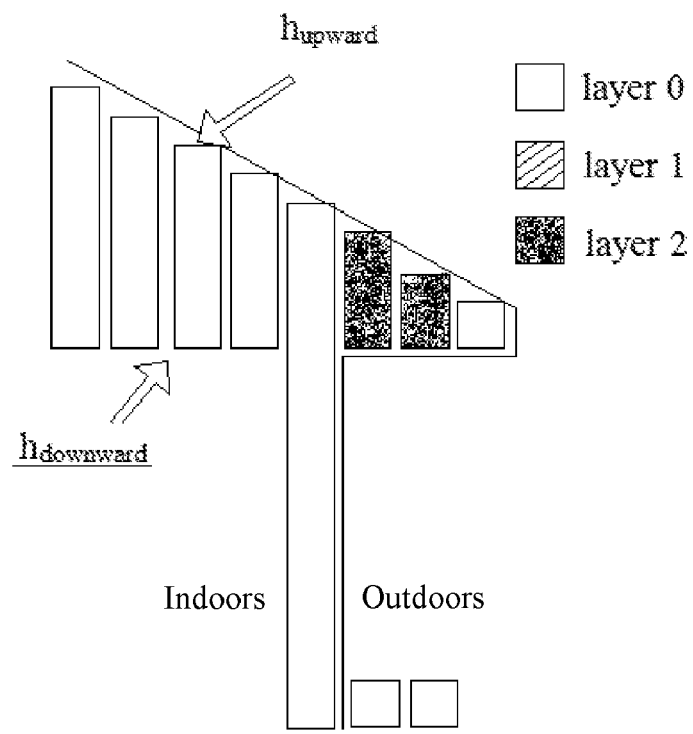
FIG. 5 is a schematic diagram of modeling a building based on a 3D scene modeling method according to an embodiment.

FIG. 5 is a schematic diagram of modeling a building based on a 3D scene modeling method in the disclosure according to an embodiment. As shown in FIG. 5, a voxel indicating a gate is a ground layer where layer=0, a voxel other than the voxel indicating the gate is a building layer, $h_{upward}$ indicates a lower edge height, and $h_{downward}$ indicates an upper edge height.

A character entity (a player or an NPC) that moves in a scene is also abstracted as a voxel (three elements, namely, a length, a width, and a height).

Based on the data description above, assuming that a character needs to walk from a Grid-A to a Grid-B, whether the two grids are connected depends on the following conditions:

(1) A Height Difference Between Two Adjacent Grids is Obtained.

If the height difference is positive, the character is moving downward, and the two grids are connected in any case; and if the height difference is negative, the character is moving upward, and if the height difference exceeds a threshold H, the two grids are not connected.

(2) A Target Grid Space is Determined.

Whether a height of the target grid space can accommodate a height of the character is determined; and whether a width of the target grid space can accommodate a width of the character is determined.

If the foregoing conditions are satisfied, it can be considered that the adjacent grids are connected. Connectivity of a path through which a character needs to pass may be determined by performing determining in the path point by point.

Figure 6:
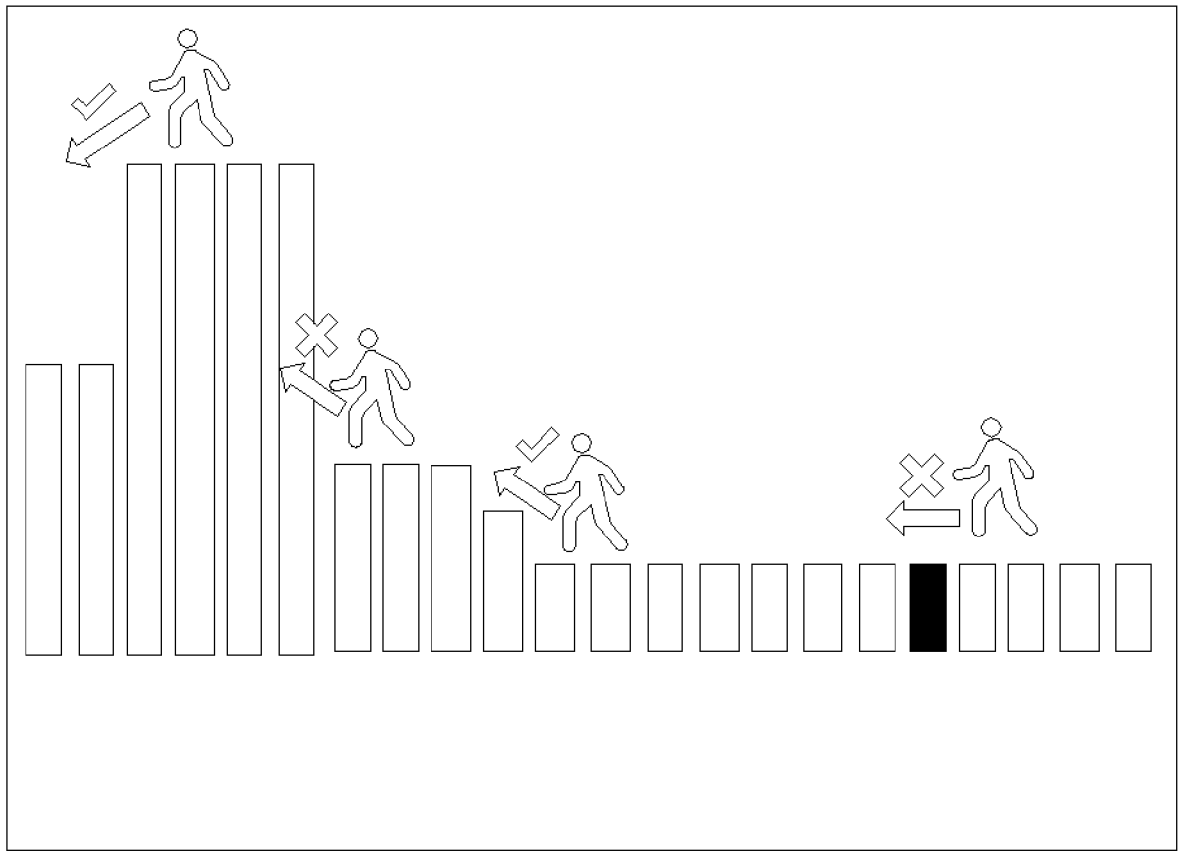
FIG. 6 is a schematic diagram of determining connectivity based on a voxel according to an embodiment.

FIG. 6 is a schematic diagram of determining connectivity based on a voxel according to an embodiment. As shown in FIG. 6, if a character is at a location a, and it is determined that a width of a target grid space in front of the character in a moving direction thereof cannot accommodate a width of the character, adjacent grids at the location a are not connected; if the character is at a location b, and it is determined that a height difference between the current location b and an adjacent grid in front is negative, the character moves upward, and if the height difference between the current location b and the adjacent grid in front does not exceed a threshold H, the location b and the adjacent grid in front are connected; if the character is at a location c, and it is determined that a height difference between the current location c of the character and an adjacent grid in front is negative, the character moves upward, and if the height difference between the current location c and the adjacent grid in front exceeds the threshold H, the location c and the adjacent grid in front are not connected; and if the character is at a location d, and it is determined that a height difference between the current location d of the character and an adjacent grid in front is positive, the character moves downward, and the location d and the adjacent grid in front are connected.

Optionally, upon observation and data analysis, it can be found that a connectivity calculation has the following characteristics:

(1) Movement of an object between adjacent grids is limited to four directions.

(2) Walking connectivity uniqueness: Between adjacent cells, in a same direction, a starting point (Src) layer can only be switched to a unique key point (Dst) layer.

(3) Repeated calculations of static data: Conditions for determining connectivity are all static, and at runtime, performing collision detection to calculate connectivity actually includes a large quantity of repeated calculations.

(4) Data characteristics: In a game map, most of the ground is in the wild, and a small ratio of area is covered by a building. According to statistics, a surface including only two layers 0, 1 covers more than 95% of the ground.

For the several characteristics above, the disclosure provides targeted optimization. That is, a connectivity cache is generated by calculating collision information in advance, to avoid repeated calculations, thereby greatly improving running performance.

In addition, extra memory consumption is reduced as much as possible when improving calculation performance is considered. According to the data characteristics above (a surface including two layers 0, 1 has a ratio of higher than 95%), merely connectivity information of the two layers 0, 1 is cached in this solution. In this way, connectivity information from a grid to remaining four adjacent grids may be described by using 8 bits (that is, a byte).

Figure 7:
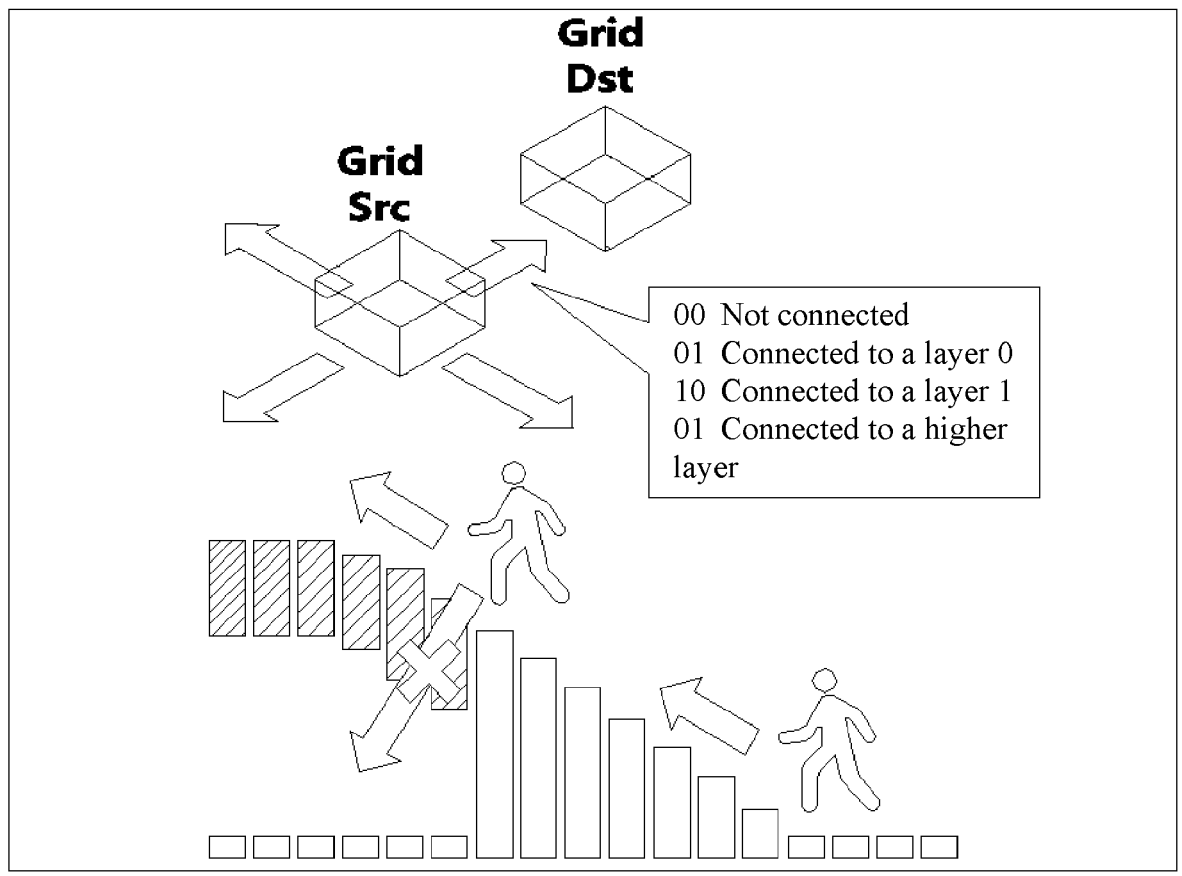
FIG. 7 is a schematic diagram of encoding connectivity information according to an embodiment.

FIG. 7 is a schematic diagram of encoding connectivity information according to an embodiment. As shown in FIG. 7:

(1) Two bits are used to store connectivity information from each grid to an adjacent grid.

(2) Two bits may have four values, and the values have the following meanings (represented in binary):

00 represents being not connected.

01 represents being connected to a layer 0.

10 represents being connected to a layer 1.

11 represents being connected to a higher layer.

(3) If each grid is adjacent to four adjacent grids, each grid needs to consume a total of 8 bits, that is, 1 byte.

(4) When a connectivity mask (mask) is not 11, connectivity information can be directly returned, and when the mask is 11, a program for dynamically determining connectivity is run to further determine connectivity. Because the foregoing statistical data indicates that 95% of the ground has 1 layer at most, it means that in most cases, the connectivity information can be directly returned from stored information (pre-cached information) without further performing a dynamic calculation.

Based on the above optimization, central processing unit (CPU) consumption required for connectivity detection in a 3D scene can be greatly reduced, and a bearing capacity of a server is improved.

According to an example embodiment, an amount of calculation can be reduced, and consumption of collision detection in a 3D scene approaches that in a 2D scene; and repeated calculations are eliminated, and a large quantity of repeated calculations in a running process is avoided by pre-generating data.

In the foregoing embodiment, an original system is optimized without affecting a player.

In the foregoing embodiment, because calculation performance is improved, while a quantity of user players that can be handled borne by a single server is increased, actions, such as a skill and a movement, of a game character are smoother, and game experience of a player is objectively improved.

The foregoing embodiment does not affect an original system kernel, and only adds a cache layer, so that an impact on the original system is small, an amount of development is small, and overall cost performance is very high.

The foregoing embodiment may improve overall performance of a server and make game experience more smooth, and may further reduce CPU consumption under the condition that a quantity of user players that can be handled is unchanged, so that a user can obtain smoother game experience.

In the foregoing embodiment, a single-server processing capacity can be improved without changing hardware, and running costs can be lowered due to improvement of the single-server processing capacity. More players are handled by fewer machines, thereby greatly lowering the running costs. Planning and design space may be further improved, more players are handled by a single process, planning may be performed to design for more players and more complex gameplay, and provide more playability for a game.

It should be noted that, for ease of description, the foregoing method embodiments are described as a series of action combinations. However, a person skilled in the art should understand that the disclosure is not limited to the described sequence of the actions, because some operations may be performed in another sequence or performed at the same time according to the disclosure. In addition, a person skilled in the art should also understand that the embodiments described in this specification all belong to example embodiments, and the involved actions and modules are not necessarily mandatory to the disclosure.

Through the descriptions of the preceding embodiments, a person skilled in the art may understand that the methods according to the foregoing embodiments may be implemented by hardware only or by software and a necessary universal hardware platform. However, in most cases, using software and a necessary universal hardware platform are widely adopted. Based on such an understanding, the technical solutions of the embodiments or the part contributing to the related technology may be implemented in a form of a software product. The computer software product is stored in a storage medium (such as a ROM/RAM, a magnetic disk, or a compact disc) and includes several instructions for instructing a terminal device (which may be a mobile phone, a computer, a server, a network device, or the like) to perform the methods described in the embodiments.

According to the embodiments, an object moving apparatus configured to perform the foregoing object moving method is further provided.

Figure 8:
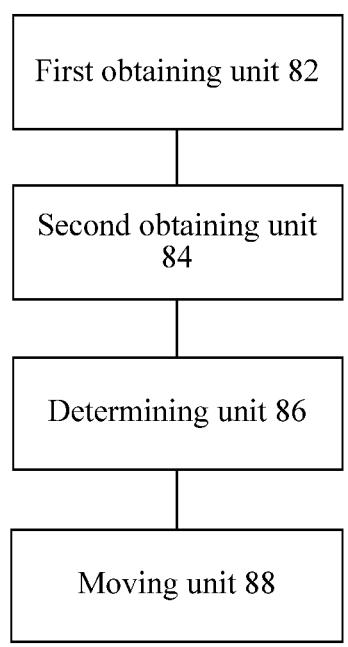
FIG. 8 is a schematic diagram of an optional object moving apparatus according to an embodiment.

FIG. 8 is a schematic diagram of an optional object moving apparatus according to an embodiment. As shown in FIG. 8, the apparatus may include: a first obtaining unit 82, configured to obtain an operation instruction, the operation instruction being used to request for moving a target object from a first grid to a second grid in a three-dimensional map, the three-dimensional map being divided into a plurality of three-dimensional grids including the first grid and the second grid, each of the grids being used to indicate a three-dimensional space; a second obtaining unit 84, configured to obtain target connectivity information between every two adjacent target grids in a target moving path, the plurality of three-dimensional grids including the every two adjacent target grids, the every two adjacent target grids including the first grid and the second grid, the target moving path being a moving path from the first grid to the second grid, the target connectivity information being used to indicate whether the every two adjacent target grids are connected, and the target connectivity information being pre-cached information; a determining unit 86, configured to determine whether the first grid and the second grid are connected according to the target connectivity information; and a moving unit 88, configured to move the target object from the first grid to the second grid in the three-dimensional map if it is determined that the first grid and the second grid are connected.

It should be noted that the first obtaining unit 82 in this embodiment may be configured to perform operation S302 in the embodiments, the second obtaining unit 84 in this embodiment may be configured to perform operation S304 in the embodiments, the determining unit 86 in this embodiment may be configured to perform operation S306 in the embodiments, and the moving unit 88 in this embodiment may be configured to perform operation S308 in the embodiments.

It should be noted herein that implemented examples and application scenarios of the foregoing modules are the same those of the corresponding operations, but are not limited to the content disclosed by the foregoing embodiment. It should be noted that the foregoing modules can operate as a part of the apparatus in a hardware environment as shown in FIG. 2, and can be implemented through software or hardware.

Figure 9:
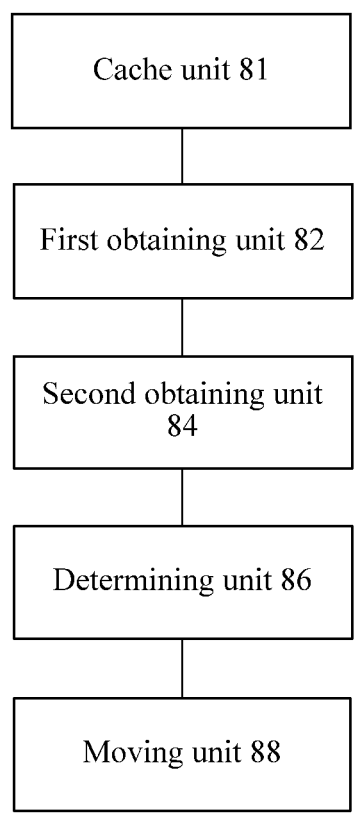
FIG. 9 is a schematic diagram of another optional object moving apparatus according to an embodiment.

In an optional embodiment, as shown in FIG. 9, the apparatus may further include: a cache unit 81, configured to: cache connectivity information of the plurality of three-dimensional grids before the operation instruction is obtained, where the connectivity information includes: connectivity information between any two adjacent grids of the plurality of three-dimensional grids.

Figure 10:
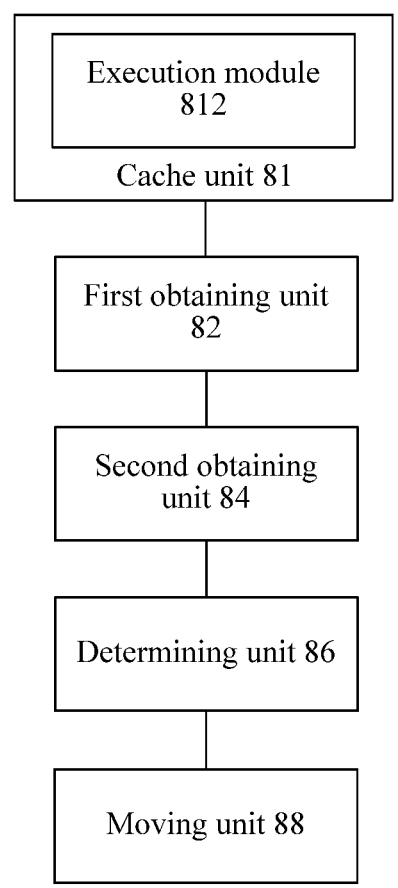
FIG. 10 is a schematic diagram of another optional object moving apparatus according to an embodiment.

In an optional embodiment, as shown in FIG. 10: the cache unit 81 may include an execution module 812, configured to perform the following operation on each of the plurality of three-dimensional grids, where each grid is recorded as a current grid in the following operation: obtaining connectivity information between the current grid and a grid adjacent to the current grid on a current layer and connectivity information between the current grid and a grid adjacent to the current grid on an adjacent layer, where the current layer is a layer on which the current grid is located in the three-dimensional map, and the adjacent layer is a layer adjacent to the current layer in the three-dimensional map.

Figure 11:
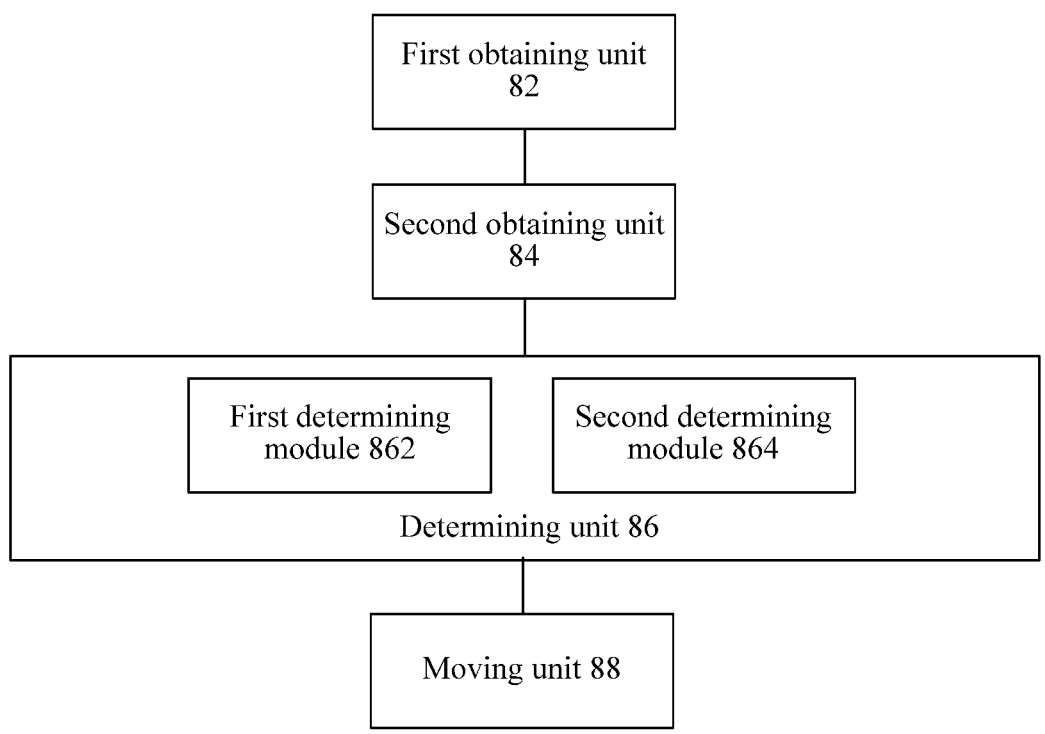
FIG. 11 is a schematic diagram of another optional object moving apparatus according to an embodiment.

In an optional embodiment, as shown in FIG. 11, the determining unit 86 may include: a first determining module 862, configured to determine that the first grid and the second grid are not connected if the target connectivity information indicates that there are two adjacent target grids that are not connected in the target moving path; and a second determining module 864, configured to determine that the first grid and the second grid are connected if the target connectivity information indicates that every two adjacent target grids are connected in the target moving path.

Figure 12:
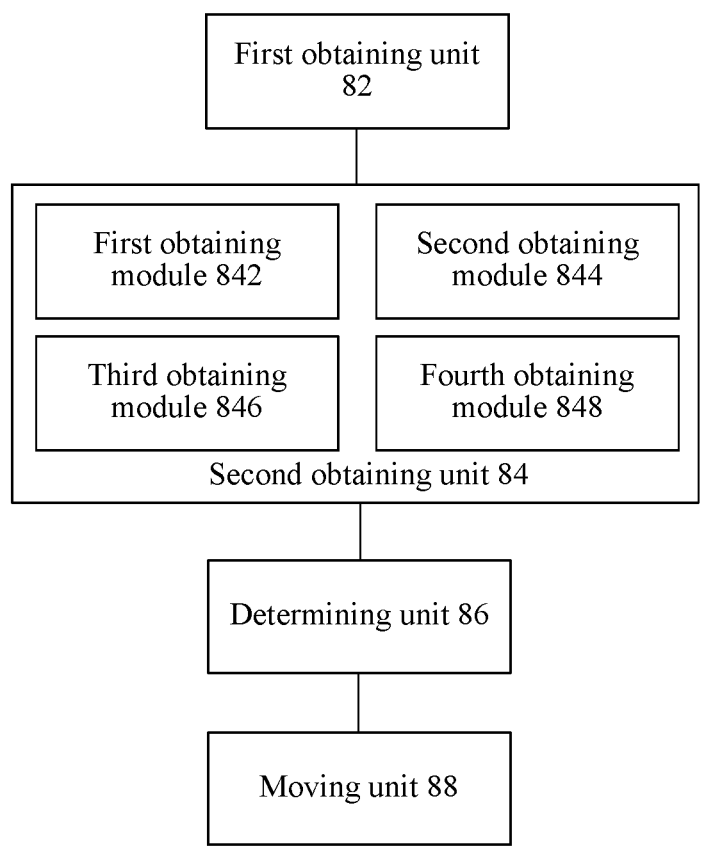
FIG. 12 is a schematic diagram of another optional object moving apparatus according to an embodiment.

In an optional embodiment, as shown in FIG. 12, the second obtaining unit 84 may include one of the following: a first obtaining module 842, configured to obtain first target connectivity information, where the first target connectivity information is used to indicate that the two target grids are not connected; a second obtaining module 844, configured to obtain second target connectivity information, where the second target connectivity information is used to indicate that the two target grids are connected, and the two target grids are located on a same layer in the three-dimensional map; a third obtaining module 846, configured to obtain third target connectivity information, where the third target connectivity information is used to indicate that the two target grids are connected, the two target grids are respectively located on two adjacent layers in the three-dimensional map, and a grid to which one target grid of the two target grids is mapped on a layer on which the other target grid of the two target grids is located is the same as or adjacent to the other target grid; and a fourth obtaining module 848, configured to obtain fourth target connectivity information, where the fourth target connectivity information is used to indicate that the two target grids are connected, and the two target grids are respectively located on different layers in the three-dimensional map, the different layers are spaced by at least one layer, and a grid to which one target grid of the two target grids is mapped on a layer on which the other target grid of the two target grids is located is the same as or adjacent to the other target grid.

Figure 13:
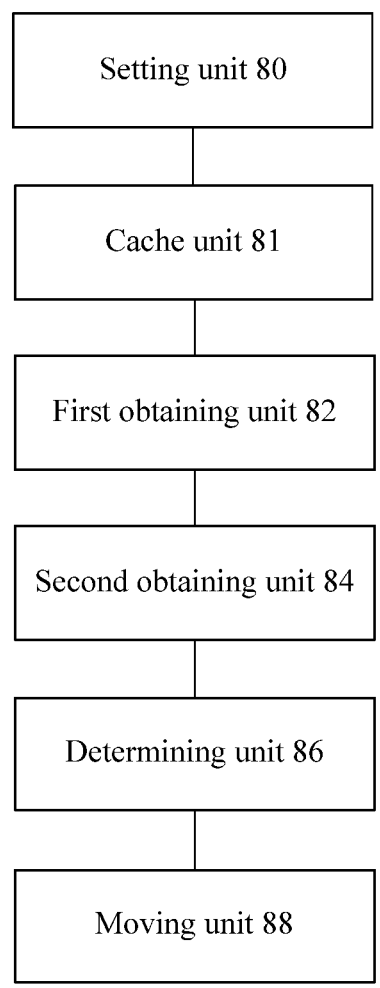
FIG. 13 is a schematic diagram of another optional object moving apparatus according to an embodiment.

In an optional embodiment, as shown in FIG. 13, the apparatus may further include: a setting unit 80, configured to set connectivity information between any two adjacent grids in the plurality of three-dimensional grids by performing the following operations before the connectivity information of the plurality of three-dimensional grids is cached, where the any two adjacent grids are referred to as a third grid and a fourth grid in performing the following operations: setting the connectivity information from the third grid to the fourth grid to indicate connectivity if a layer on which the third grid is located in the three-dimensional map is higher than a layer on which the fourth grid is located in the three-dimensional map, a height of the fourth grid is greater than or equal to a height of the target object, and a width of the fourth grid is greater than or equal to width of the target object; setting the connectivity information from the fourth grid to the third grid to indicate connectivity if a layer on which the third grid is located in the three-dimensional map is lower than a layer on which the fourth grid is located in the three-dimensional map, a height of the third grid is greater than or equal to a height of the target object, and a width of the third grid is greater than or equal to width of the target object; setting the connectivity information from the third grid to the fourth grid to indicate connectivity if a layer on which the third grid is located in the three-dimensional map is lower than a layer on which the fourth grid is located in the three-dimensional map by a first height difference, the first height difference is less than or equal to a first threshold, a height of the fourth grid is greater than or equal to a height of the target object, and a width of the fourth grid is greater than or equal to a width of the target object; and setting the connectivity information from the fourth grid to the third grid to indicate connectivity if a layer on which the third grid is located in the three-dimensional map is higher than a layer on which the fourth grid is located in the three-dimensional map by a second height difference, the second height difference is less than or equal to a second threshold, a height of the third grid is greater than or equal to a height of the target object, and a width of the third grid is greater than or equal to a width of the target object.

Based on the foregoing modules, a three-dimensional map is divided into a plurality of three-dimensional grids, and each grid indicates a three-dimensional space. After an operation instruction used to request for moving a target object from a first grid to a second grid is obtained, whether the first grid and the second grid are connected is determined by obtaining pre-cached target connectivity information between every two adjacent target grids in a target moving path from the first grid to the second grid, thereby improving efficiency in determining location connectivity. Further, if it is determined that the first grid and the second grid are connected, the target object is moved from the first grid to the second grid, so that the target object can be quickly moved from the first grid to the second grid, thereby solving the technical problem of relatively low efficiency in moving an object from a location to another location in the related technology and achieving technical effects of shortening a time consumed for object moving and improving object moving efficiency.

According to the embodiments, an electronic apparatus configured to perform the foregoing object moving method is further provided.

Figure 14:
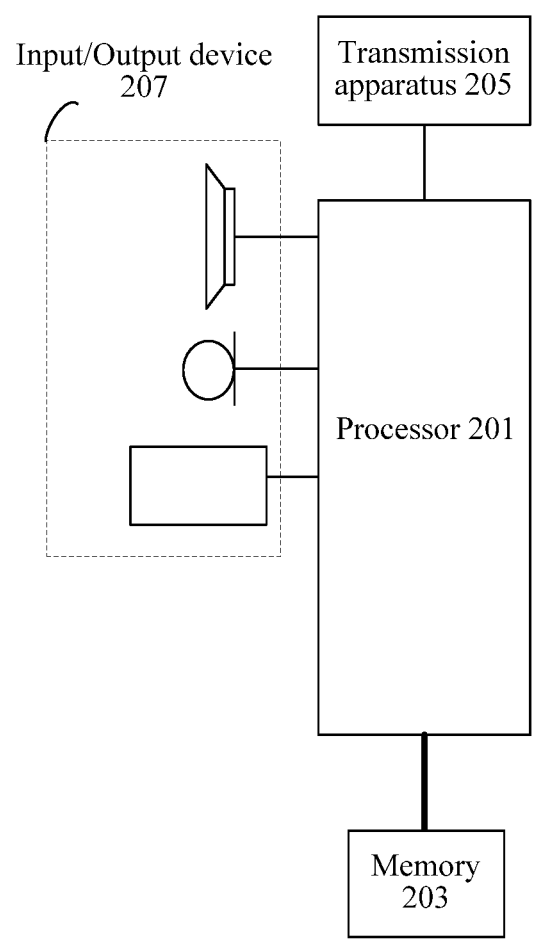
FIG. 14 is a structural block diagram of an electronic apparatus according to an embodiment.

FIG. 14 is a structural block diagram of an electronic apparatus according to an embodiment. As shown in FIG. 14, the electronic apparatus may include: one or more (only one is shown in the figure) processors 201 and a memory 203. The memory 203 may store a computer program, and the processor 201 may be configured to run the computer program to perform the object moving method of the embodiments. Optionally, the electronic apparatus may further include: a transmission apparatus 205 and an input/output device 207.

The memory 203 may be configured to store a computer program and a module, for example, a program instruction/module corresponding to the object moving method and apparatus in the embodiments, and the processor 201 performs various functional applications and data processing by running the computer program and the module stored in the memory 203, that is, implementing the foregoing object moving method. The memory 203 may include a high-speed random memory, and may alternatively include a nonvolatile memory such as one or more magnetic storage devices, a flash memory, or another nonvolatile solid-state memory. In some instances, the memory 203 may further include memories remotely disposed relative to the processor 201, and these remote memories may be connected to the terminal through a network. Instances of the network include, but are not limited to, the Internet, an intranet, a local area network, a mobile communications network, and a combination thereof.

The foregoing transmission apparatus 205 is configured to receive or send data through a network. Specific examples of the foregoing network may include a wired network and a wireless network. In an example, the transmission apparatus 205 includes a network interface controller (NIC) that may be connected to another network device and a router by using a network cable, thereby communicating with the Internet or a local area network. In an example, the transmission apparatus 205 is a radio frequency (RF) module that is configured to communicate with the Internet in a wireless manner.

Specifically, the memory 203 is configured to store a computer program.

The processor 201 may invoke the computer program stored in the memory 203 to perform the following operations: obtaining an operation instruction, the operation instruction being used to request for moving a target object from a first grid to a second grid in a three-dimensional map, the three-dimensional map being divided into a plurality of three-dimensional grids including the first grid and the second grid, each of the grids being used to indicate a three-dimensional space; obtaining target connectivity information between every two adjacent target grids in a target moving path, the plurality of three-dimensional grids including the every two adjacent target grids, the every two adjacent target grids including the first grid and the second grid, the target moving path being a moving path from the first grid to the second grid, the target connectivity information being used to indicate whether the every two adjacent target grids are connected, and the target connectivity information being pre-cached information; determining whether the first grid and the second grid are connected according to the target connectivity information; and moving the target object from the first grid to the second grid in the three-dimensional map if determining that the first grid and the second grid are connected.

The processor 201 is further configured to perform the following operation: caching connectivity information of the plurality of three-dimensional grids, where the connectivity information includes: connectivity information between any two adjacent grids of the plurality of three-dimensional grids.

The processor 201 is further configured to perform the following operation: performing the following operation on each of the plurality of three-dimensional grids, where each grid is recorded as a current grid in the following operation: obtaining connectivity information between the current grid and a grid adjacent to the current grid on a current layer and connectivity information between the current grid and a grid adjacent to the current grid on an adjacent layer, where the current layer is a layer on which the current grid is located in the three-dimensional map, and the adjacent layer is a layer adjacent to the current layer in the three-dimensional map.

The processor 201 is further configured to perform the following operations: determining that the first grid and the second grid are not connected if the target connectivity information indicates that there are two adjacent target grids that are not connected in the target moving path; and determining that the first grid and the second grid are connected if the target connectivity information indicates that every two adjacent target grids are connected in the target moving path.

The processor 201 is further configured to perform the following operations: obtaining first target connectivity information, where the first target connectivity information is used to indicate that the two target grids are not connected; obtaining second target connectivity information, where the second target connectivity information is used to indicate that the two target grids are connected, and the two target grids are located on a same layer in the three-dimensional map; obtaining third target connectivity information, where the third target connectivity information is used to indicate that the two target grids are connected, the two target grids are respectively located on two adjacent layers in the three-dimensional map, and a grid to which one target grid of the two target grids is mapped on a layer on which the other target grid of the two target grids is located is the same as or adjacent to the other target grid; and obtaining fourth target connectivity information, where the fourth target connectivity information is used to indicate that the two target grids are connected, and the two target grids are respectively located on different layers in the three-dimensional map, the different layers are spaced by at least one layer, and a grid to which one target grid of the two target grids is mapped on a layer on which the other target grid of the two target grids is located is the same as or adjacent to the other target grid.

The processor 201 is further configured to perform the following operation: before the caching connectivity information of the plurality of three-dimensional grids, setting connectivity information between any two adjacent grids in the plurality of three-dimensional grids by performing the following operations, where the any two adjacent grids are referred to as a third grid and a fourth grid in performing the following operations: setting the connectivity information from the third grid to the fourth grid to indicate connectivity if a layer on which the third grid is located in the three-dimensional map is higher than a layer on which the fourth grid is located in the three-dimensional map, a height of the fourth grid is greater than or equal to a height of the target object, and a width of the fourth grid is greater than or equal to width of the target object; setting the connectivity information from the fourth grid to the third grid to indicate connectivity if a layer on which the third grid is located in the three-dimensional map is lower than a layer on which the fourth grid is located in the three-dimensional map, a height of the third grid is greater than or equal to a height of the target object, and a width of the third grid is greater than or equal to width of the target object; setting the connectivity information from the third grid to the fourth grid to indicate connectivity if a layer on which the third grid is located in the three-dimensional map is lower than a layer on which the fourth grid is located in the three-dimensional map by a first height difference, the first height difference is less than or equal to a first threshold, a height of the fourth grid is greater than or equal to a height of the target object, and a width of the fourth grid is greater than or equal to a width of the target object; and setting the connectivity information from the fourth grid to the third grid to indicate connectivity if a layer on which the third grid is located in the three-dimensional map is higher than a layer on which the fourth grid is located in the three-dimensional map by a second height difference, the second height difference is less than or equal to a second threshold, a height of the third grid is greater than or equal to a height of the target object, and a width of the third grid is greater than or equal to a width of the target object.

According to an example embodiment, an object moving solution is provided, and in the solution, a three-dimensional map is divided into a plurality of three-dimensional grids, and each grid indicates a three-dimensional space. After an operation instruction used to request for moving a target object from a first grid to a second grid is obtained, whether the first grid and the second grid are connected is determined by obtaining pre-cached target connectivity information between every two adjacent target grids in a target moving path from the first grid to the second grid, thereby improving efficiency in determining location connectivity. Further, if it is determined that the first grid and the second grid are connected, the target object is moved from the first grid to the second grid, so that the target object can be quickly moved from the first grid to the second grid, thereby solving the technical problem of relatively low efficiency in moving an object from a location to another location in the related technology and achieving technical effects of shortening a time consumed for object moving and improving object moving efficiency.

Optionally, for a specific example in this embodiment, the examples described in the foregoing embodiments may be referred to, and details are not described herein again in this embodiment.

A person of ordinary skill in the art may understand that, the structure shown in FIG. 14 is only illustrative. The electronic apparatus may be a terminal device such as a smartphone (such as an Android mobile phone or an iOS mobile phone), a tablet computer, a palmtop computer, a mobile Internet device (MID), or a PAD. FIG. 14 does not limit the structure of the foregoing electronic apparatus. For example, the electronic apparatus may alternatively include more or less components (such as a network interface and a display apparatus) than those shown in FIG. 14, or has a configuration different from that shown in FIG. 14.

A person of ordinary skill in the art may understand that all or a part of the operations of the methods of the foregoing embodiments may be implemented by a program instructing relevant hardware of a terminal device. The program may be stored in a computer readable storage medium. The storage medium may be a flash disk, a read-only memory (ROM), a random access memory (RAM), a magnetic disk, or a compact disc.

This embodiment of this application further provides a storage medium. Optionally, in this embodiment, the storage medium stores a computer program. The computer program is configured to perform, during running, the object moving method.

Optionally, in this embodiment, the foregoing storage medium may be located in at least one of a plurality of network devices in the network shown in the foregoing embodiment.

Optionally, in this embodiment, the storage medium is configured to store program code used for performing the following operations:

S1: Obtain an operation instruction, the operation instruction being used to request for moving a target object from a first grid to a second grid in a three-dimensional map, the three-dimensional map being divided into a plurality of three-dimensional grids including the first grid and the second grid, each of the grids being used to indicate a three-dimensional space.

S2: Obtain target connectivity information between every two adjacent target grids in a target moving path, the plurality of three-dimensional grids including the every two adjacent target grids, the every two adjacent target grids including the first grid and the second grid, the target moving path being a moving path from the first grid to the second grid, the target connectivity information being used to indicate whether the every two adjacent target grids are connected, and the target connectivity information being pre-cached information.

S3: Determine whether the first grid and the second grid are connected according to the target connectivity information.

S4: The client moves the target object from the first grid to the second grid in the three-dimensional map if determining that the first grid and the second grid are connected.

Optionally, the storage medium is further configured to store program code used for performing the following operation: caching connectivity information of the plurality of three-dimensional grids, where the connectivity information includes: connectivity information between any two adjacent grids of the plurality of three-dimensional grids.

Optionally, the storage medium is further configured to store program code used for performing the following operation: performing the following operation on each of the plurality of three-dimensional grids, where each grid is recorded as a current grid in the following operation: obtaining connectivity information between the current grid and a grid adjacent to the current grid on a current layer and connectivity information between the current grid and a grid adjacent to the current grid on an adjacent layer, where the current layer is a layer on which the current grid is located in the three-dimensional map, and the adjacent layer is a layer adjacent to the current layer in the three-dimensional map.

Optionally, the storage medium is further configured to store program code used for performing the following operations: determining that the first grid and the second grid are not connected if the target connectivity information indicates that there are two adjacent target grids that are not connected in the target moving path; and determining that the first grid and the second grid are connected if the target connectivity information indicates that every two adjacent target grids are connected in the target moving path.

Optionally, the storage medium is further configured to store program code used for performing the following operations: obtaining first target connectivity information, where the first target connectivity information is used to indicate that the two target grids are not connected; obtaining second target connectivity information, where the second target connectivity information is used to indicate that the two target grids are connected, and the two target grids are located on a same layer in the three-dimensional map; obtaining third target connectivity information, where the third target connectivity information is used to indicate that the two target grids are connected, the two target grids are respectively located on two adjacent layers in the three-dimensional map, and a grid to which one target grid of the two target grids is mapped on a layer on which the other target grid of the two target grids is located is the same as or adjacent to the other target grid; and obtaining fourth target connectivity information, where the fourth target connectivity information is used to indicate that the two target grids are connected, and the two target grids are respectively located on different layers in the three-dimensional map, the different layers are spaced by at least one layer, and a grid to which one target grid of the two target grids is mapped on a layer on which the other target grid of the two target grids is located is the same as or adjacent to the other target grid.

Optionally, the storage medium is further configured to store program code used for performing the following operation: before the caching connectivity information of the plurality of three-dimensional grids, setting connectivity information between any two adjacent grids in the plurality of three-dimensional grids by performing the following operations, where the any two adjacent grids are referred to as a third grid and a fourth grid in performing the following operations: setting the connectivity information from the third grid to the fourth grid to indicate connectivity if a layer on which the third grid is located in the three-dimensional map is higher than a layer on which the fourth grid is located in the three-dimensional map, a height of the fourth grid is greater than or equal to a height of the target object, and a width of the fourth grid is greater than or equal to width of the target object; setting the connectivity information from the fourth grid to the third grid to indicate connectivity if a layer on which the third grid is located in the three-dimensional map is lower than a layer on which the fourth grid is located in the three-dimensional map, a height of the third grid is greater than or equal to a height of the target object, and a width of the third grid is greater than or equal to width of the target object; setting the connectivity information from the third grid to the fourth grid to indicate connectivity if a layer on which the third grid is located in the three-dimensional map is lower than a layer on which the fourth grid is located in the three-dimensional map by a first height difference, the first height difference is less than or equal to a first threshold, a height of the fourth grid is greater than or equal to a height of the target object, and a width of the fourth grid is greater than or equal to a width of the target object; and setting the connectivity information from the fourth grid to the third grid to indicate connectivity if a layer on which the third grid is located in the three-dimensional map is higher than a layer on which the fourth grid is located in the three-dimensional map by a second height difference, the second height difference is less than or equal to a second threshold, a height of the third grid is greater than or equal to a height of the target object, and a width of the third grid is greater than or equal to a width of the target object.

Optionally, for a specific example in this embodiment, the examples described in the foregoing embodiments may be referred to, and details are not described herein again in this embodiment.

Optionally, in this embodiment, the foregoing storage medium may include, for example but is not limited to: any medium that can store program code, such as a USB flash drive, a read-only memory (ROM), a random access memory (RAM), a removable hard disk, a magnetic disk, or a compact disc.

The sequence numbers of the preceding embodiments are merely for description but do not indicate the preference of the embodiments.

When the integrated unit in the foregoing embodiment is implemented in a form of a software functional module and sold or used as an independent product, the integrated unit may be stored in the foregoing computer-readable storage medium. Based on such an understanding, the technical solutions of the embodiments essentially, or the part contributing to the related technology, or all or some of the technical solutions may be implemented in a form of a software product. The computer software product is stored in a storage medium and includes several instructions for instructing one or more computer devices (which may be a personal computer, a server, a network device, or the like) to perform all or some of the operations of the methods described in the embodiments.

In the foregoing embodiments, descriptions of the embodiments have different emphases, and as for parts that are not described in detail in one embodiment, reference can be made to the relevant description of the other embodiments.

In the several embodiments provided in the present application, it should be understood that the disclosed client may be implemented in other manners. The described apparatus embodiments are merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electronic or other forms.

The units described as separate parts may or may not be physically separate, and the parts displayed as units may or may not be physical units, may be located in one location, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware, or may be implemented in a form of a software functional unit.

In an example embodiment, a three-dimensional map is divided into a plurality of three-dimensional grids, and each grid indicates a three-dimensional space. After an operation instruction used to request for moving a target object from a first grid to a second grid is obtained, whether the first grid and the second grid are connected is determined by obtaining pre-cached target connectivity information between every two adjacent target grids in a target moving path from the first grid to the second grid, thereby improving efficiency of determining location connectivity. Further, if it is determined that the first grid and the second grid are connected, the target object is moved from the first grid to the second grid, so that the target object can be quickly moved from the first grid to the second grid. Accordingly, the example embodiment solves the technical problem of relatively low efficiency in moving an object from a location to another location in the related technology and achieves technical effects of shortening a time and hardware resources consumed for object moving and improving object moving efficiency.

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in some of block diagrams, communication between the components, elements or units may be performed through the bus. Functional aspects of the above exemplary embodiments may be implemented in algorithms that execute on one or more processors. Furthermore, the components, elements or units represented by a block or processing operations may employ any number of related art techniques for electronics configuration, signal processing and/or control, data processing and the like.

The foregoing embodiments are merely intended for describing the technical solutions, but not for limiting the disclosure. Although the disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments.

What is claimed is:

1. A method of moving an object in an application, the method comprising:
   generating pre-cached connectivity information, which includes connectivity information between any two immediately adjacent grids of a plurality of three-dimensional grids, the plurality of three-dimensional grids being obtained by dividing a three-dimensional map and each of the plurality of three-dimensional grids being used to indicate a three-dimensional space, the pre-cached connectivity information being generated for each grid of the plurality of three-dimensional grids by calculating collision information in advance;
   obtaining, by at least one processor, an operation instruction for moving a target object from a first grid to a second grid among the plurality of three-dimensional grids;
   obtaining from the pre-cached connectivity information, by the at least one processor, pre-cached target connectivity information indicating whether every two adjacent target grids in a target moving path from the first grid to the second grid are connected, wherein the target moving path comprises at least three grids;
   determining, by the at least one processor, that the first grid and the second grid are connected based on the pre-cached target connectivity information indicating that all of two immediately adjacent target grids, of the at least three grids of the target moving path, are connected; and
   moving, by the at least one processor, the target object from the first grid to the second grid in the three-dimensional map based on determining that the first grid and the second grid are connected.

2. The method according to claim 1, further comprising caching the connectivity information, the caching comprises, with respect to each grid that is recorded as a current grid:
   obtaining connectivity information between the current grid and a grid adjacent to the current grid on a current layer and connectivity information between the current grid and a grid adjacent to the current grid on an adjacent layer, wherein the current layer is a layer on which the current grid is located in the three-dimensional map, and the adjacent layer is a layer adjacent to the current layer in the three-dimensional map; and
   caching the obtained connectivity information.

3. The method according to claim 1, wherein the obtaining the pre-cached target connectivity information comprises one of the following:
   obtaining, by the at least one processor, first target connectivity information indicating that two adjacent target grids are not connected;
   obtaining, by the at least one processor, second target connectivity information indicating that the two adjacent target grids are connected, and the two adjacent target grids are located on a same layer in the three-dimensional map;
   obtaining, by the at least one processor, third target connectivity information indicating that the two adjacent target grids are connected, the two adjacent target grids are respectively located on two adjacent layers in the three-dimensional map, and a grid to which a first target grid of the two adjacent target grids is mapped on a layer on which a second target grid of the two adjacent target grids is located is the same as or adjacent to the second target grid; and
   obtaining, by the at least one processor, fourth target connectivity information indicating that the two adjacent target grids are connected, and the two adjacent target grids are respectively located on different layers in the three-dimensional map, the different layers are spaced by at least one layer, and a grid to which the first target grid of the two adjacent target grids is mapped on a layer on which the second target grid of the two adjacent target grids is located is the same as or adjacent to the second target grid.

4. The method according to claim 1, further comprising, with respect to a third grid and a fourth grid that are given two adjacent grids in the plurality of three-dimensional grids, setting connectivity information indicating one of the following:
   first connectivity information from the third grid to the fourth grid to indicate first connectivity in a case where a layer on which the third grid is located in the three-dimensional map is higher than a layer on which the fourth grid is located in the three-dimensional map, a height of the fourth grid is greater than or equal to a height of the target object, and a width of the fourth grid is greater than or equal to width of the target object;
   second connectivity information from the fourth grid to the third grid to indicate second connectivity in a case where the layer on which the third grid is located in the three-dimensional map is lower than the layer on which the fourth grid is located in the three-dimensional map, a height of the third grid is greater than or equal to a height of the target object, and a width of the third grid is greater than or equal to width of the target object;
   third connectivity information from the third grid to the fourth grid to indicate third connectivity in a case where the layer on which the third grid is located in the three-dimensional map is lower than the layer on which the fourth grid is located in the three-dimensional map by a first height difference, the first height difference is less than or equal to a first threshold, a height of the fourth grid is greater than or equal to a height of the target object, and a width of the fourth grid is greater than or equal to a width of the target object; and
   fourth connectivity information from the fourth grid to the third grid to indicate fourth connectivity in a case where the layer on which the third grid is located in the three-dimensional map is higher than the layer on which the fourth grid is located in the three-dimensional map by a second height difference, the second height difference is less than or equal to a second threshold, a height of the third grid is greater than or equal to a height of the target object, and a width of the third grid is greater than or equal to a width of the target object.

5. An electronic apparatus, comprising at least one memory operable to store program code; and the at least one processor operable to read the program code and operate as instructed by the program code to perform the method of claim 1.

6. An object moving apparatus, comprising:
at least one memory operable to store program code; and
at least one processor operable to read the program code and operate as instructed by the program code, the program code comprising:
generating code configured to cause the at least one processor to generate pre-cached connectivity information, which includes connectivity information between any two immediately adjacent grids of a plurality of three-dimensional grids, the plurality of three-dimensional grids being obtained by dividing a three-dimensional map and each of the plurality of three-dimensional grids being used to indicate a three-dimensional space, the pre-cached connectivity information being generated for each grid of the plurality of three-dimensional grids by calculating collision information in advance;
first obtaining code configured to cause the at least one processor to obtain an operation instruction for moving a target object from a first grid to a second grid among the plurality of three-dimensional grids;
second obtaining code configured to cause the at least one processor to obtain, from the pre-cached connectivity information, pre-cached target connectivity information indicating whether every two adjacent target grids in a target moving path from the first grid to the second grid are connected, wherein the target moving path comprises at least three grids;
determining code configured to cause the at least one processor to determine that the first grid and the second grid are connected based on the pre-cached target connectivity information indicating that all of two immediately adjacent target grids, of the at least three grids of the target moving path, are connected; and
moving code configured to cause the at least one processor to move the target object from the first grid to the second grid in the three-dimensional map based on determining that the first grid and the second grid are connected.

7. The apparatus according to claim 6, wherein the program code further comprises caching code configured to cause the at least one processor to, with respect to each grid that is recorded as a current grid:
obtain connectivity information between the current grid and a grid adjacent to the current grid on a current layer and connectivity information between the current grid and a grid adjacent to the current grid on an adjacent layer, wherein the current layer is a layer on which the current grid is located in the three-dimensional map, and the adjacent layer is a layer adjacent to the current layer in the three-dimensional map; and
cache the obtained connectivity information.

8. The apparatus according to claim 6, wherein the program code further comprises caching code configured to cause the at least one processor to, with respect to each grid that is recorded as a current grid:
obtain connectivity information between the current grid and a grid adjacent to the current grid on a current layer and connectivity information between the current grid and a grid adjacent to the current grid on an adjacent layer, wherein the current layer is a layer on which the current grid is located in the three-dimensional map, and the adjacent layer is a layer adjacent to the current layer in the three-dimensional map; and
cache the obtained connectivity information.

9. The apparatus according to claim 6, wherein the second obtaining code causes the at least one processor to obtain one of the following:
first target connectivity information indicating that two adjacent target grids are not connected;
second target connectivity information indicating that the two adjacent target grids are connected, and the two adjacent target grids are located on a same layer in the three-dimensional map;
third target connectivity information indicating that the two adjacent target grids are connected, the two adjacent target grids are respectively located on two adjacent layers in the three-dimensional map, and a grid to which a first target grid of the two adjacent target grids is mapped on a layer on which a second target grid of the two adjacent target grids is located is the same as or adjacent to the second target grid; and
fourth target connectivity information indicating that the two adjacent target grids are connected, and the two adjacent target grids are respectively located on different layers in the three-dimensional map, the different layers are spaced by at least one layer, and a grid to which the first target grid of the two adjacent target grids is mapped on a layer on which the second target grid of the two adjacent target grids is located is the same as or adjacent to the second target grid.

10. The apparatus according to claim 6, wherein the program code further comprises setting code configured to cause the at least one processor to, with respect to a third grid and a fourth grid that are given two adjacent grids in the plurality of three-dimensional grids, set connectivity information indicating one of the following:
first connectivity in a case where a layer on which the third grid is located in the three-dimensional map is higher than a layer on which the fourth grid is located in the three-dimensional map, a height of the fourth grid is greater than or equal to a height of the target object, and a width of the fourth grid is greater than or equal to width of the target object;
second connectivity in a case where the layer on which the third grid is located in the three-dimensional map is lower than the layer on which the fourth grid is located in the three-dimensional map, a height of the third grid is greater than or equal to a height of the target object, and a width of the third grid is greater than or equal to width of the target object;
third connectivity in a case where the layer on which the third grid is located in the three-dimensional map is lower than the layer on which the fourth grid is located in the three-dimensional map by a first height difference, the first height difference is less than or equal to a first threshold, a height of the fourth grid is greater than or equal to a height of the target object, and a width of the fourth grid is greater than or equal to a width of the target object; and
fourth connectivity in a case where the layer on which the third grid is located in the three-dimensional map is higher than the layer on which the fourth grid is located in the three-dimensional map by a second height difference, the second height difference is less than or equal to a second threshold, a height of the third grid is greater than or equal to a height of the target object, and a width of the third grid is greater than or equal to a width of the target object.

11. A non-transitory storage medium, the storage medium storing a computer program executed by at least one processor to perform:
generating pre-cached connectivity information, which includes connectivity information between any two immediately adjacent grids of a plurality of three-dimensional grids, the plurality of three-dimensional grids being obtained by dividing a three-dimensional map and each of the plurality of three-dimensional grids being used to indicate a three-dimensional space, the pre-cached connectivity information being generated for each grid of the plurality of three-dimensional grids by calculating collision information in advance;
obtaining an operation instruction for moving a target object from a first grid to a second grid among the plurality of three-dimensional grids;
obtaining, from the pre-cached connectivity information, pre-cached target connectivity information indicating whether every two adjacent target grids in a target moving path from the first grid to the second grid are connected, wherein the target moving path comprises at least three grids;
determining that the first grid and the second grid are connected based on the pre-cached target connectivity information indicating that all of two immediately adjacent target grids, of the at least three grids of the target moving path, are connected; and
moving the target object from the first grid to the second grid in the three-dimensional map based on determining that the first grid and the second grid are connected.

12. The storage medium according to claim 11, further comprising caching the connectivity information, the caching comprises, with respect to each grid that is recorded as a current grid:
obtaining connectivity information between the current grid and a grid adjacent to the current grid on a current layer and connectivity information between the current grid and a grid adjacent to the current grid on an adjacent layer, wherein the current layer is a layer on which the current grid is located in the three-dimensional map, and the adjacent layer is a layer adjacent to the current layer in the three-dimensional map; and
caching the obtained connectivity information.

13. The storage medium according to claim 11, wherein the obtaining the pre-cached target connectivity information comprises one of the following:
obtaining, by the at least one processor, first target connectivity information indicating that two adjacent target grids are not connected;
obtaining, by the at least one processor, second target connectivity information indicating that the two adjacent target grids are connected, and the two adjacent target grids are located on a same layer in the three-dimensional map;
obtaining, by the at least one processor, third target connectivity information indicating that the two adjacent target grids are connected, the two adjacent target grids are respectively located on two adjacent layers in the three-dimensional map, and a grid to which a first target grid of the two adjacent target grids is mapped on a layer on which a second target grid of the two adjacent target grids is located is the same as or adjacent to the second target grid; and
obtaining, by the at least one processor, fourth target connectivity information indicating that the two adjacent target grids are connected, and the two adjacent target grids are respectively located on different layers in the three-dimensional map, the different layers are spaced by at least one layer, and a grid to which the first target grid of the two adjacent target grids is mapped on a layer on which the second target grid of the two adjacent target grids is located is the same as or adjacent to the second target grid.

14. The method according to claim 11, further comprising, with respect to a third grid and a fourth grid that are given two adjacent grids in the plurality of three-dimensional grids, setting connectivity information indicating one of the following:
first connectivity information from the third grid to the fourth grid to indicate first connectivity in a case where a layer on which the third grid is located in the three-dimensional map is higher than a layer on which the fourth grid is located in the three-dimensional map, a height of the fourth grid is greater than or equal to a height of the target object, and a width of the fourth grid is greater than or equal to width of the target object;
second connectivity information from the fourth grid to the third grid to indicate second connectivity in a case where the layer on which the third grid is located in the three-dimensional map is lower than the layer on which the fourth grid is located in the three-dimensional map, a height of the third grid is greater than or equal to a height of the target object, and a width of the third grid is greater than or equal to width of the target object;
third connectivity information from the third grid to the fourth grid to indicate third connectivity in a case where the layer on which the third grid is located in the three-dimensional map is lower than the layer on which the fourth grid is located in the three-dimensional map by a first height difference, the first height difference is less than or equal to a first threshold, a height of the fourth grid is greater than or equal to a height of the target object, and a width of the fourth grid is greater than or equal to a width of the target object; and
fourth connectivity information from the fourth grid to the third grid to indicate fourth connectivity in a case where the layer on which the third grid is located in the three-dimensional map is higher than the layer on which the fourth grid is located in the three-dimensional map by a second height difference, the second height difference is less than or equal to a second threshold, a height of the third grid is greater than or equal to a height of the target object, and a width of the third grid is greater than or equal to a width of the target object.

* * * * *